(12) United States Patent
Yasui

(10) Patent No.: US 6,900,861 B2
(45) Date of Patent: May 31, 2005

(54) ELECTRIC OPTICAL APPARATUS USING A COMPOSITE SUBSTRATE FORMED BY BONDING A SEMICONDUCTOR SUBSTRATE AND MANUFACTURING METHOD OF THE SAME, PROJECTION DISPLAY, AND ELECTRONIC INSTRUMENT

(75) Inventor: Atsuhito Yasui, Chino (JP)

(73) Assignee: Seiko Epson Corporation, Tokyo (JP)

( * ) Notice: Subject to any disclaimer, the term of this patent is extended or adjusted under 35 U.S.C. 154(b) by 23 days.

(21) Appl. No.: 10/225,137

(22) Filed: Aug. 22, 2002

(65) Prior Publication Data

US 2003/0048395 A1 Mar. 13, 2003

(30) Foreign Application Priority Data

Aug. 27, 2001 (JP) .......................................... 2001-256739
Jun. 27, 2002 (JP) .......................................... 2002-188612

(51) Int. Cl.[7] ........................ G02F 1/1333; G02F 1/136; G02F 1/13; H01L 29/04
(52) U.S. Cl. ........................ 349/110; 349/44; 349/138; 349/187; 257/59
(58) Field of Search ........................... 349/187, 42–44, 349/110, 111, 122, 138; 257/59, 72

(56) References Cited

U.S. PATENT DOCUMENTS 5,233,211 A * 8/1993 Hayashi et al. .............. 257/347
5,637,187 A * 6/1997 Takasu et al. ................. 438/30

| 6,358,759 | B1 | 3/2002 | Hirabayashi |
| 6,697,136 | B1 | 2/2004 | Yasukawa .................... 349/113 |
| 2002/0037600 | A1 | 3/2002 | Hirabayshi |

FOREIGN PATENT DOCUMENTS

| JP | 4-1333033 | * | 5/1992 |
| JP | A-10-293320 | | 11/1998 |
| JP | 2000-075808 A | | 3/2000 |
| JP | A-2000-221541 | | 8/2000 |
| JP | 2000-338903 | | 12/2000 |
| JP | 2001-013522 A | | 1/2001 |
| JP | A-2001-92372 | | 4/2001 |
| JP | 2001-166337 | | 6/2001 |
| JP | 2002-100779 A | | 4/2002 |
| JP | 2002-169178 A | | 6/2002 |

* cited by examiner

*Primary Examiner*—Tarifur R. Chowdhury
(74) *Attorney, Agent, or Firm*—Oliff & Berridge, PLC

(57) ABSTRACT

The invention provides an electric optical apparatus and a manufacturing method thereof, in which, when forming a contact hole by wet etching to control an electric potential of a light-shielding layer, etching liquid does not infiltrate the bonding boundary between a supporting substrate and a semiconductor substrate. An electric optical apparatus includes a first insulator layer formed on an underside of a semiconductor layer, a second insulator layer formed on a side lower than the first insulator layer, a light-shielding layer formed between the first insulator layer and the second insulator layer, and a contact hole passing through at least the first insulator layer to the light-shielding layer. The light-shielding layer is located at a position upper than that of the bonding boundary between a supporting substrate and a semiconductor substrate.

15 Claims, 16 Drawing Sheets

FIG. 4
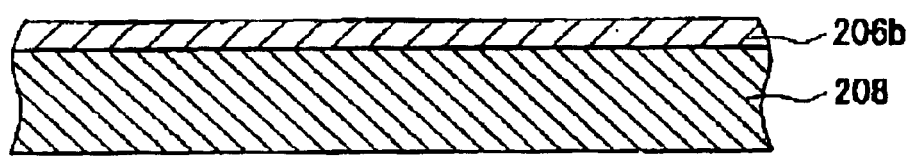
(a)
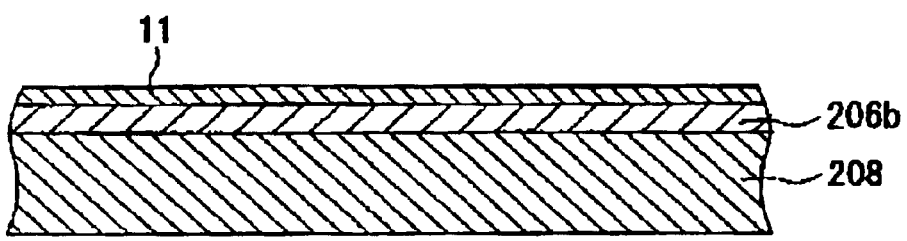
(b)
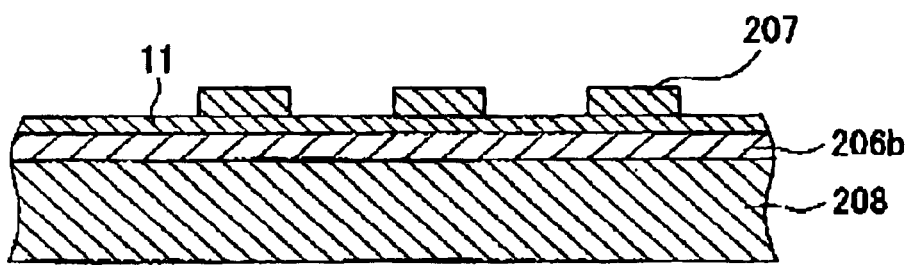
(c)
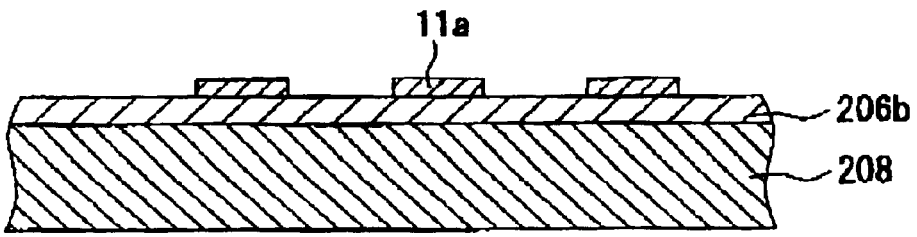
(d)

FIG. 6
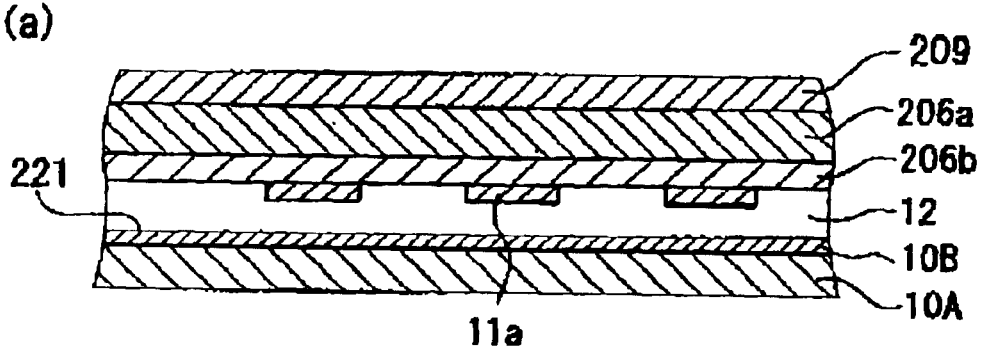
(a)
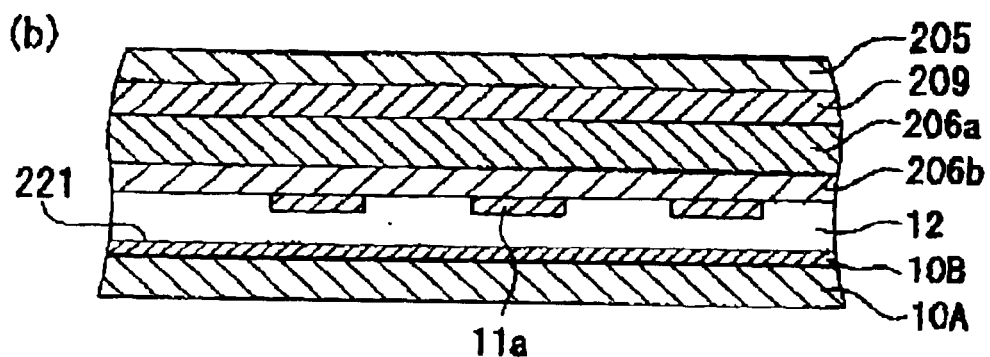
(b)
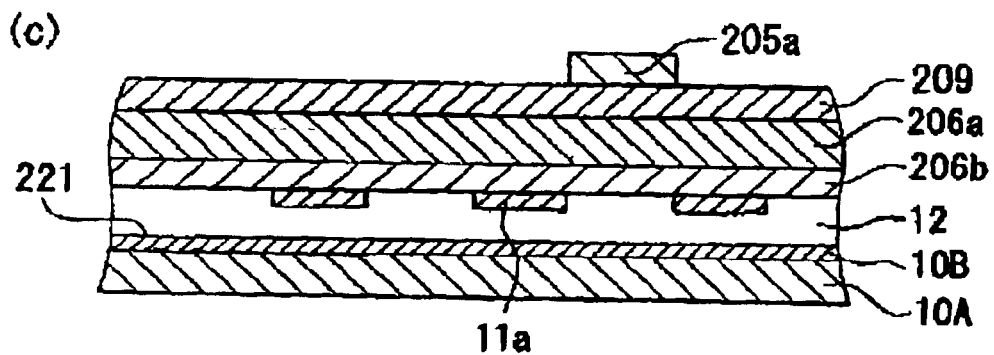
(c)
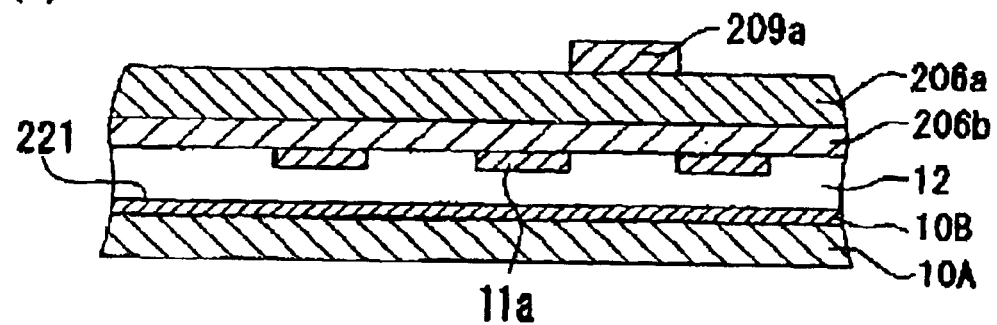
(d)

FIG. 8
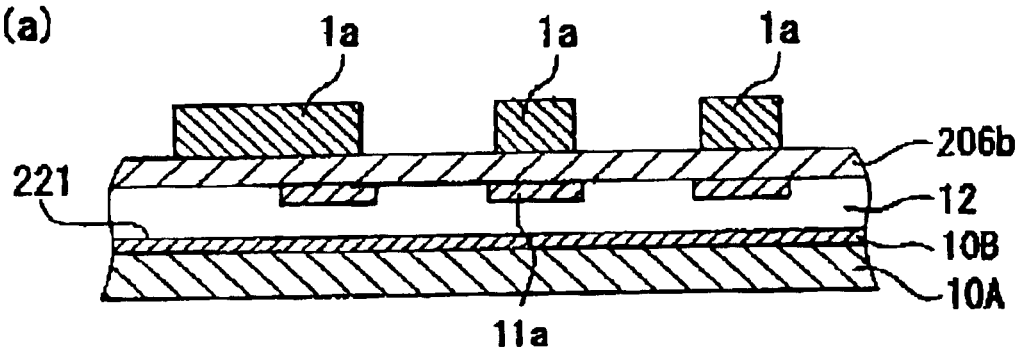
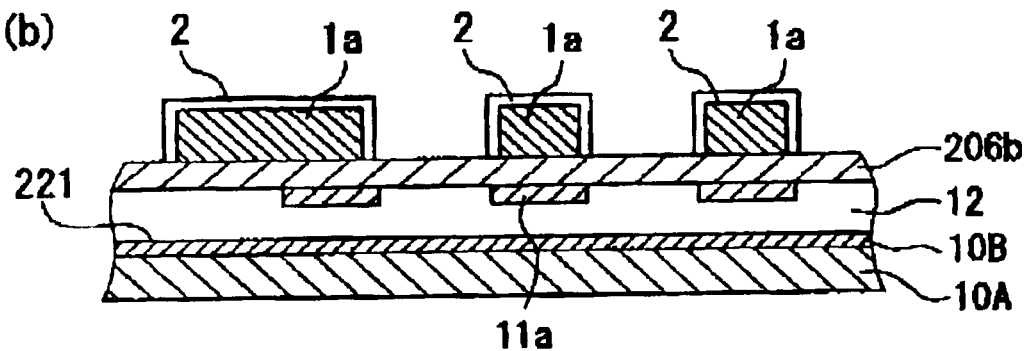

FIG. 9
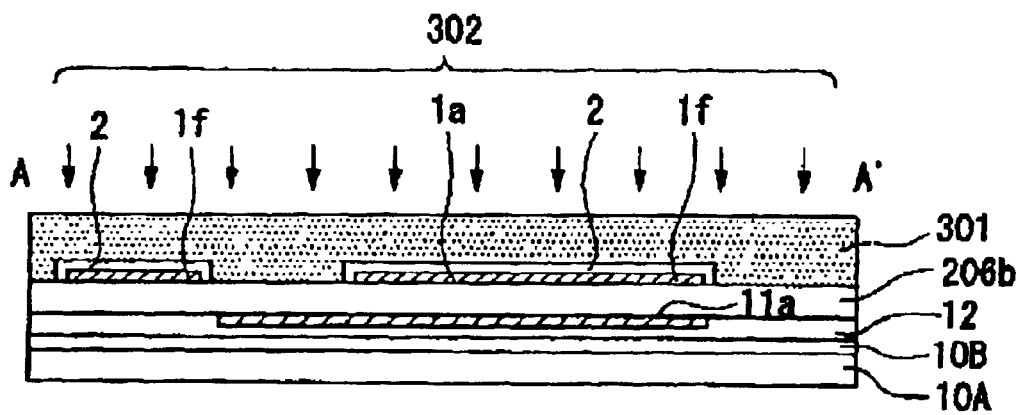
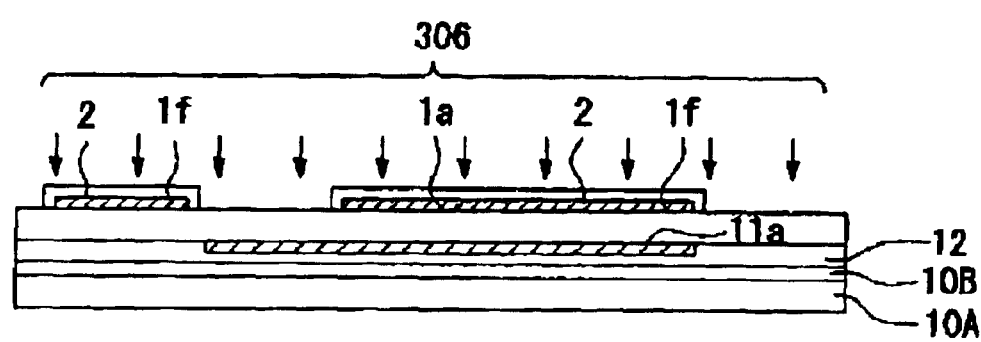
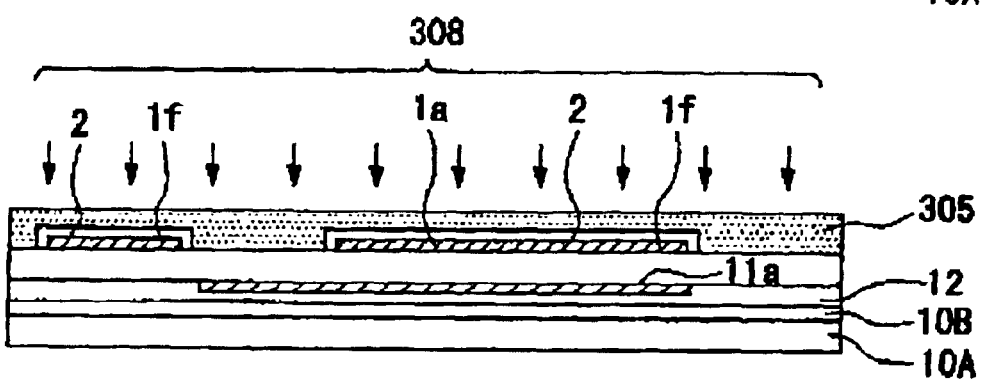
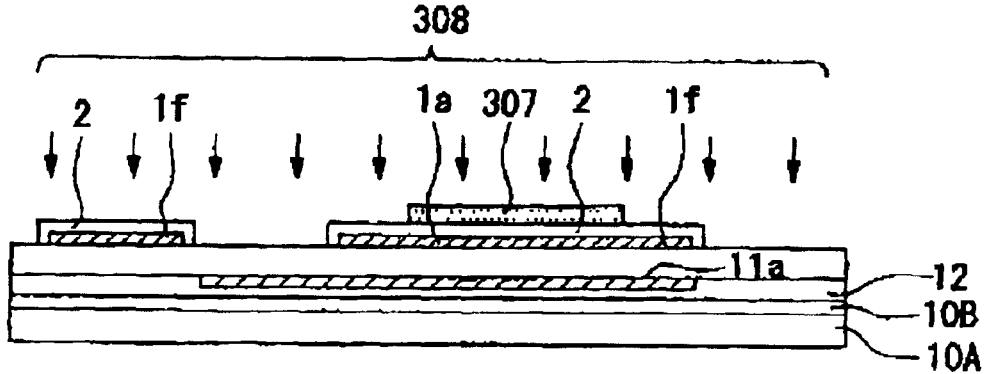

FIG. 12
(a)
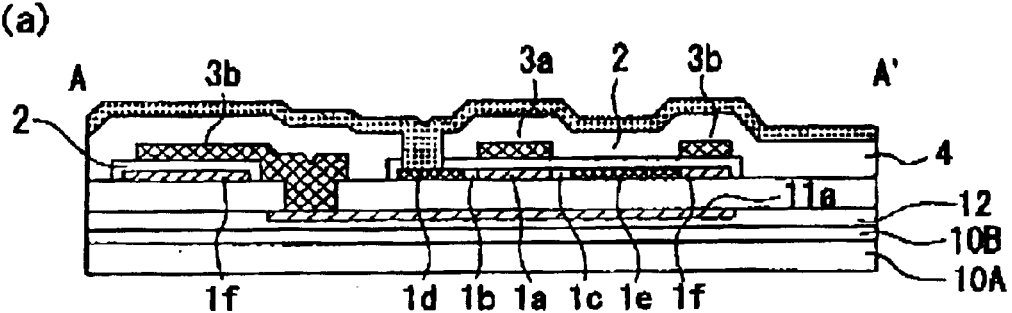
(b)
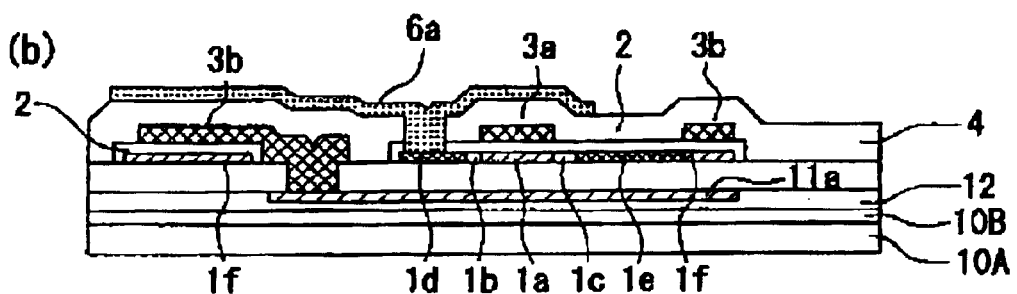
(c)
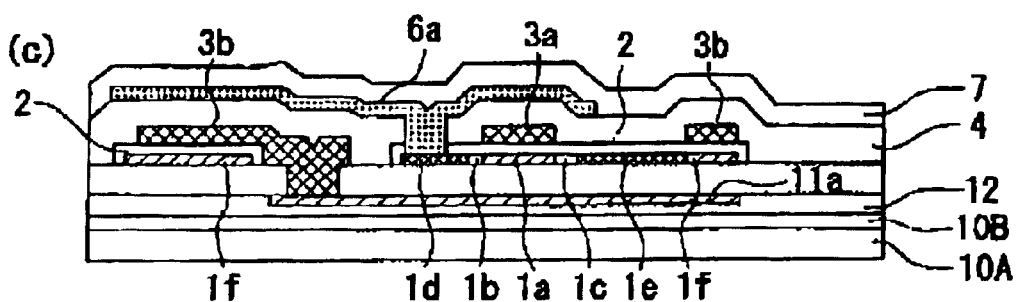

FIG. 13
(a)
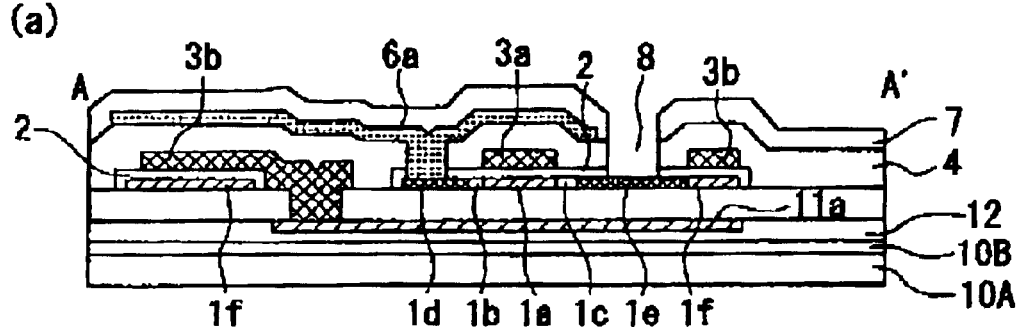
(b)
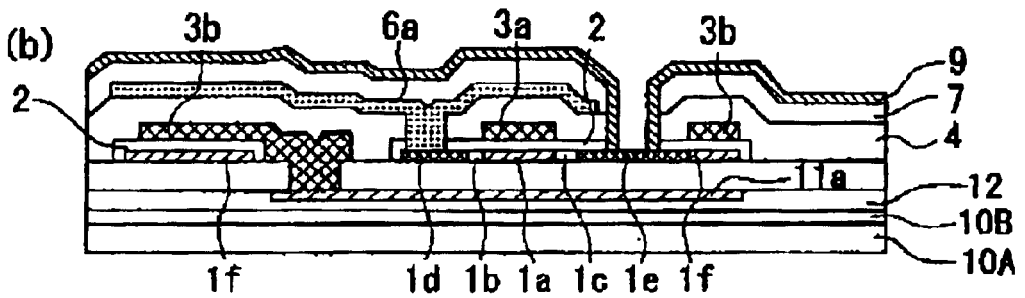
(c)
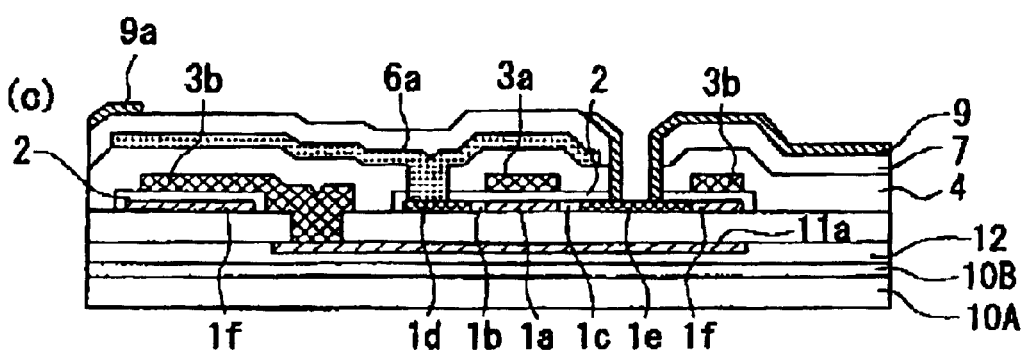

ELECTRIC OPTICAL APPARATUS USING A COMPOSITE SUBSTRATE FORMED BY BONDING A SEMICONDUCTOR SUBSTRATE AND MANUFACTURING METHOD OF THE SAME, PROJECTION DISPLAY, AND ELECTRONIC INSTRUMENT

BACKGROUND OF THE INVENTION

1. Field of Invention

The present invention relates to an electric optical apparatus employing a Silicon-On-Insulator (hereinafter SOI) technique and a manufacturing method thereof, a projection display, and an electronic instrument. More specifically, the invention relates to a highly reliable electric optical apparatus capable of being manufactured with high yield and a manufacturing method thereof, and a highly reliable projection display and electronic instrument including the electric optical apparatuses.

2. Description of Related Art

The SOI technique, in which a semiconductor thin film made of silicon, etc., is formed on an insulating substrate so as to form a semiconductor device therefrom. Such a semiconductor device provides advantages in that elements can be increased in speed, r electric power consumption can be reduced, and it can be highly integrated so as to be preferably incorporated into the electric optical apparatus, for example.

In order to manufacture the electric optical apparatus employing the SOI technique, a semiconductor substrate having a monocrystalline semiconductor layer made of monocrystalline silicon, etc., is bonded on a supporting substrate so as to form a thin-film monocrystalline semiconductor layer by polishing or the like, so that the thin-film monocrystalline semiconductor layer is formed to be a transistor element, such as a thin-film transistor (hereinafter TFT), to drive liquid crystal.

Also, the electric optical apparatus employing the SOI technique has been applied in the related art to a liquid-crystal light valve of a projection display, such as a liquid crystal projector. In such a liquid-crystal light valve, when the supporting substrate has optical transparency, incident light from a display surface is reflected at an interface of the supporting substrate in the back side, so that it may enter a channel region of the transistor element, such as the TFT, as returned light. Therefore, a liquid-crystal light valve is put forward, in which a light-shielding layer formed at a position corresponding to the transistor-element channel region in the front side of the supporting substrate to shield the returned light.

Also, in such a liquid-crystal light valve having the light-shielding layer formed in the front side of the supporting substrate, an electric potential of the light-shielding layer is fixed at a constant potential by electrically connecting the light-shielding layer to a potentiostatic source, so that changes in the electric potential of the light-shielding layer do not have an adverse affect on the transistor element.

In order to manufacture such an electric optical apparatus having the light-shielding layer formed on the front surface of the supporting substrate, after the light-shielding layer is patterned on the front surface of the supporting substrate and covered with an insulating layer thereon so as to be flattened by polishing, the obtained flattened surface is bonded to a semiconductor substrate. Then, by polishing a monocrystalline semiconductor layer constituting the semiconductor substrate, a thin-film monocrystalline semiconductor layer is formed to have the transistor element such as the TFT for driving liquid crystal. A contact hole, which passes through the insulating layer formed on the supporting substrate to the light-shielding layer, is formed by wet etching at a position where the thin-film monocrystalline semiconductor layer of the semiconductor substrate bonded on the supporting substrate does not exist, so that the light-shielding layer and the potentiostatic source are electrically connected via the contact hole.

SUMMARY OF THE INVENTION

However, in the electric optical apparatus described above, because the contact hole used to control the light-shielding layer potential is formed by penetrating the insulating layer formed on the supporting substrate by the wet etching, there is a problem that when forming the contact hole, etching liquid infiltrates the bonding boundary between the supporting substrate and the semiconductor substrate, so that even the layers constituting the bonding boundary are etched. When the layers constituting the bonding boundary are etched, defects, such as exfoliation between the supporting substrate and the semiconductor substrate, may be produced, reducing yield of the product.

The present invention addresses or solves the problem described above, and provides a highly reliable electric optical apparatus adapting an SOI technique thereto and having a light-shielding layer on the surface of a supporting substrate, and also being capable of being manufactured with high yield, because when forming a contact hole by wet etching for fixing an electric potential of the light-shielding layer at a potentiostatic, there is no problem that etching liquid infiltrates the bonding boundary between the supporting substrate and a semiconductor substrate.

Also, the invention provides a manufacturing method of the above-mentioned electric optical apparatus, and a highly reliable projection display and electronic instrument having the electric optical apparatuses.

In order to address or achieve the advantages described above, in an electric optical apparatus using a composite substrate formed by bonding a semiconductor substrate comprising a semiconductor layer on a supporting substrate, the electric optical apparatus according to the present invention includes a first insulator layer formed on an underside of the semiconductor layer, a second insulator layer formed on a side lower than the first insulator layer, a light-shielding layer formed between the first insulator layer and the second insulator layer, and a contact hole passing through at least the first insulator layer to the light-shielding layer. The light-shielding layer is located at a position upper than that of the bonding boundary between the supporting substrate and the semiconductor substrate.

That is, in the electric optical apparatus according to the present invention, the supporting substrate, the second insulator layer, the light-shielding layer, the first insulator layer, and the semiconductor layer are formed in that order from the underside, so that the contact bole passing through the first insulator layer, which is located on the side further upper than the light-shielding layer being located at a position upper than that of the bonding boundary, to the light-shielding layer does not pass through the bonding boundary between the semiconductor substrate and the supporting substrate.

Therefore, when forming the contact hole by using wet etching, the disadvantage of the related art electric optical apparatus where etching liquid infiltrates the bonding boundary between the supporting substrate and the semiconductor substrate does not occur. Accordingly, a highly reliable electric optical apparatus capable of being manufactured with high yield can be obtained.

In the electric optical apparatus according to the present invention, as described above, the light-shielding layer is located on the side upper than the bonding boundary between the supporting substrate and the semiconductor substrate. Therefore, as will be described in the following, the distance between the semiconductor layer and the light-shielding layer can be reduced by reducing the thickness of the first insulator layer.

For example, when the light-shielding layer is located on the side lower than the bonding boundary, the bonding boundary exists between the semiconductor layer and the light-shielding layer, so that the distance between the semiconductor layer and the light-shielding layer cannot be reduced. When the bonding boundary exists between the semiconductor layer and the light-shielding layer, the distance between the semiconductor layer and the light-shielding layer includes the distance equivalent to the residual film thickness for not producing the light-shielding layer exposure due to variations in polishing when performing chemical and mechanical polishing, and the distance equivalent to the thickness necessary to bond the semiconductor substrate on the supporting substrate. Therefore, the distance between the semiconductor layer and the light-shielding layer generally is the size obtained as a result after bonding the semiconductor substrate on the supporting substrate, so that it is approximately from 800 nm to 1000 mm, which is extremely larger than the thickness necessary to insulate the semiconductor layer from the light-shielding layer. Also, when the distance between the semiconductor layer and the light-shielding layer is 200 nm or less, it is difficult to perform the chemical and mechanical polishing before the bonding, so that when the light-shielding layer is located on the side lower than the bonding boundary, the distance between the semiconductor layer and the light-shielding layer cannot be reduced to 200 nm or less.

Whereas, according to the electric optical apparatus of the present invention, as described above, since the light-shielding layer is located on the side upper than the bonding boundary between the supporting substrate and the semiconductor substrate, the bonding boundary does not exist between the semiconductor layer and the light-shielding layer, so that the distance between the semiconductor layer and the light-shielding layer does not include the distance equivalent to the residual film thickness to not produce the light-shielding layer exposure due to variations in polishing when performing chemical and mechanical polishing, and the distance equivalent to the thickness necessary to bond the semiconductor substrate on the supporting substrate. Therefore, the distance between the semiconductor layer and the light-shielding layer can be reduced within the range capable of insulating the semiconductor layer from the light-shielding layer.

That is, in the electric optical apparatus according to the present invention, the thickness of the first insulator layer equivalent to the distance between the semiconductor layer and the light-shielding layer can be reduced.

When the thickness of the first insulator layer is reduced, the semiconductor layer approaches the light-shielding layer, enabling the light-shielding layer to be actively used to backgate of the TFT, for example, so that an off-leak curt can be reduced or an on-state current can be increased by controlling the potential of the light-shielding layer.

Specifically, in the electric optical apparatus described above, it is preferable that the thickness of the first insulator layer be in a range of 30 nm to 200 nm.

In such an electric optical apparatus, the semiconductor layer can be securely insulated from the light-shielding layer while by controlling the potential of the light-shielding layer, the off-leak current can be reduced or the on-state current can be increased, so that a more excellent electric optical apparatus can be obtained.

Also, in the electric optical apparatus described above, it is more preferable that the thickness of the first insulator layer be in a range of 50 nm to 100 nm.

In such an electric optical apparatus, the semiconductor layer can be more securely insulated from the light-shielding layer while the off-leak current can be reduced or the on-state current can be increased more effectively.

In order to achieve the object described above, an electric optical apparatus according to the present invention uses a composite substrate formed by bonding a semiconductor substrate comprising a semiconductor layer and a light-shielding layer on a supporting substrate. The light-shielding layer is located at a position upper than that of the bonding boundary between the supporting substrate and the semiconductor substrate.

In such an electric optical apparatus, the light-shielding layer is located on the side upper than the bonding boundary between the supporting substrate and the semiconductor substrate, so that when forming the contact hole passing through a member formed above the light-shielding layer to the light-shielding layer, the contact hole does not pass through the bonding boundary between the semiconductor substrate and the supporting substrate. Therefore, when forming the contact hole by using wet etching, the disadvantage of the related art electric optical apparatus where etching liquid infiltrates the bonding boundary between the supporting substrate and the semiconductor substrate does not occur, Also, the light-shielding layer is located on the side upper than the bonding boundary between the supporting substrate and the semiconductor substrate, so that the bonding boundary does not exist between the semiconductor layer and the light-shielding layer and the distance between the semiconductor layer and the light-shielding layer can be reduced within the range capable of insulating the semiconductor layer from the light-shielding layer.

Also, in order to address or achieve the advantages described above, a projection display according to the present invention has the electric optical apparatus described above and includes a light source, the electric optical apparatus modulating the emitted light from the light source, and a magnifying projection optical system to magnify and project the light modulated by the electric optical apparatus on a projection surface.

Such a projection display is highly reliable because it has the electric optical apparatus described above.

Also, in order to address or achieve the advantage described above, an electronic instrument according to the present invention includes the electric optical apparatus described above.

Such an electronic instrument becomes the electronic instrument having a highly reliable display.

Also, in order to address or achieve the advantage described above, in a manufacturing method of an electric optical apparatus using a composite substrate formed by bonding a semiconductor substrate that includes a semiconductor layer on a supporting substrate, the method according to the present invention comprises: sequentially forming a first insulator layer, a light-shielding layer, and a second insulator layer in that order on a surface of the semiconductor substrate, on which the supporting substrate is bonded; bonding the semiconductor substrate on the supporting substrate to form the composite substrate; patterning the semiconductor layer; and forming a contact hole passing through the first insulator layer to the light-shielding layer by wet etching.

Since such a manufacturing method of an electric optical apparatus includes: sequentially forming a first insulator layer, a light-shielding layer, and a second insulator layer in that order on the surface of the semiconductor substrate, on which the supporting substrate is bonded; and bonding the semiconductor substrate on the supporting substrate to form the composite substrate, the light-shielding layer is located higher than the bonding boundary between the supporting substrate and the semiconductor substrate, so that in forming a contact bole passing through the first insulator layer to the light-shielding layer by wet etching, the bonding boundary between the supporting substrate and the semiconductor substrate does not need to be penetrated. Therefore, when forming the contact bole by wet etching, the disadvantage that etching liquid infiltrates the bonding boundary between the supporting substrate and the semiconductor substrate does not occur. Accordingly, a highly reliable electric optical apparatus capable of being manufactured with high yield can be obtained.

Since the manufacturing method comprises sequentially forming the first insulator layer, the light-shielding layer, and the second insulator layer in that order on the surface of the semiconductor substrate, on which the supporting substrate is bonded; and bonding the semiconductor substrate on the supporting substrate to form the composite substrate, the semiconductor substrate and the supporting substrate are bonded together after forming the light-shielding layer on the semiconductor substrate, so that the bonding boundary does not exist between the semiconductor layer and the light-shielding layer. Therefore, the thickness of the first insulator layer equivalent to the distance between the semiconductor layer and the light-shielding layer can be reduced within the range being capable of insulating the semiconductor layer from the light-shielding layer.

In the manufacturing method of the electric optical apparatus described above, preferably, the thickness of the first insulator layer is between 30 nm and 200 nm.

By such a manufacturing method of the electric optical apparatus, while the semiconductor layer is securely insulated firm the light-shielding layer, an off-leak current can be reduced or an on-state current can be increased by controlling the potential of the light-shielding layer, resulting in obtaining a more excellent electric optical apparatus.

In the manufacturing method of the electric optical apparatus described above, preferably, the surface of the second insulator layer is flattened by a chemical and mechanical polishing (CMP) method.

By such a manufacturing method of the electric optical apparatus, the surface of the second insulator layer can be easily and accurately flattened, so that when the second insulator layer constitutes the bonding boundary between the supporting substrate and the semiconductor substrate, the adhesion between the supporting substrate and the semiconductor substrate can be increased, so that the bonding can be readily and accurately performed. This results in readily forming a highly reliable electric optical apparatus.

BRIEF DESCRIPTION OF THE DRAWINGS

FIGS. 4(a)–4(d) are schematics of a manufacturing process of a liquid crystal apparatus according to an embodiment (Part 1);

FIGS. 6(a)–6(d) are schematics of the manufacturing process of the liquid crystal apparatus according to the embodiment (Part 3);

FIGS. 8(a) and 8(b) are schematics of the manufacturing process of the liquid crystal apparatus according to the embodiment (Part 5);

FIGS. 9(a)–9(d) are schematics of the manufacturing process of the liquid crystal apparatus according to the embodiment (Part 6);

FIGS. 12(a)–12(c) are schematics of the manufacturing process of the: liquid crystal apparatus according to the embodiment (Part 9);

FIGS. 13(a)–13(c) are schematics of the manufacturing process of the liquid crystal apparatus according to the embodiment (Part 10);

DETAILED DESCRIPTION OF PREFERRED EMBODIMENTS

Embodiments according to the present invention will be described in detail below.

According to the embodiment, an active-matrix type liquid crystal apparatus using a TFT (transistor element) as a switching element is exemplified as an example of the electric optical apparatus.

Figure 1:
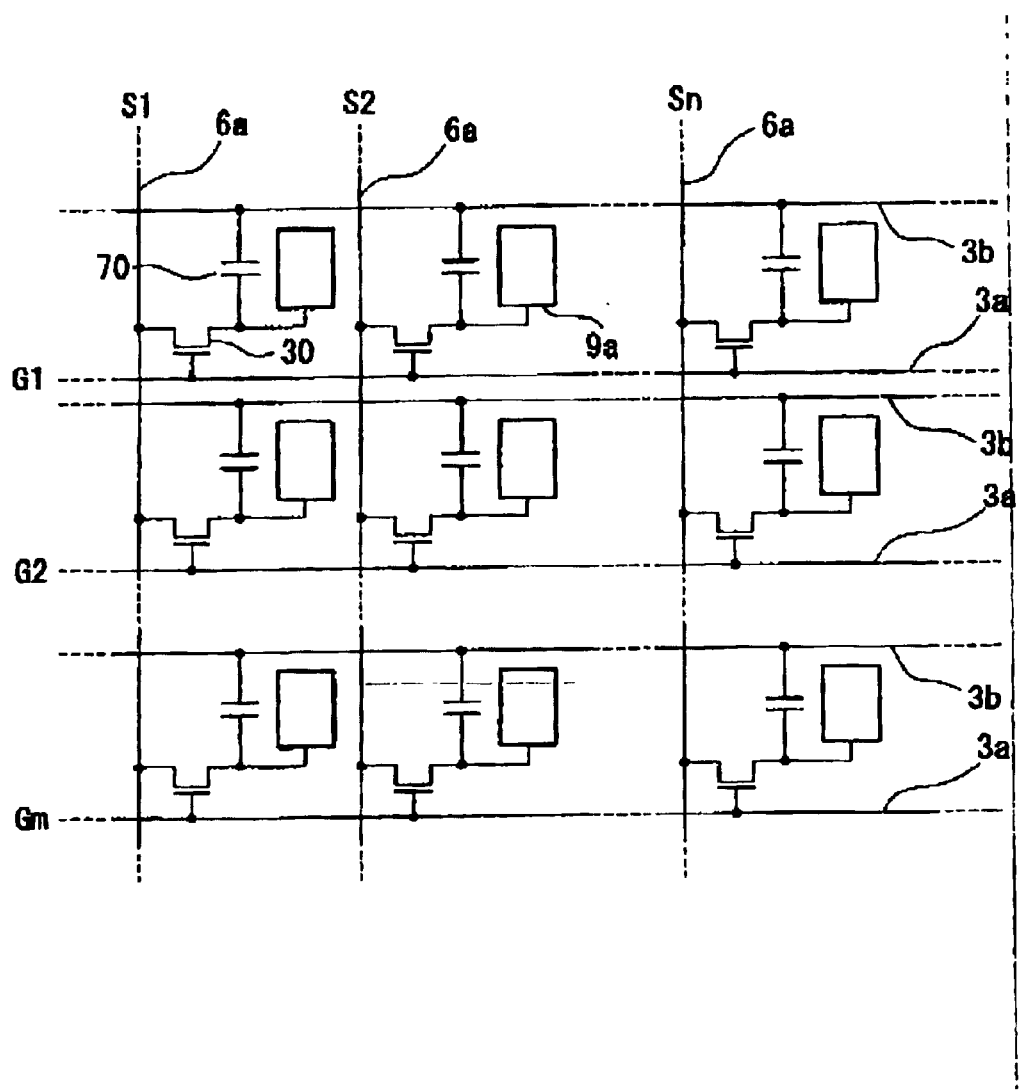
FIG. 1 is a schematic that shows an equivalent circuit of various elements and wiring in a plurality of pixels formed in a matrix arrangement and constituting a pixel part (display region) of a liquid crystal apparatus according to the present invention.
Figure 2:
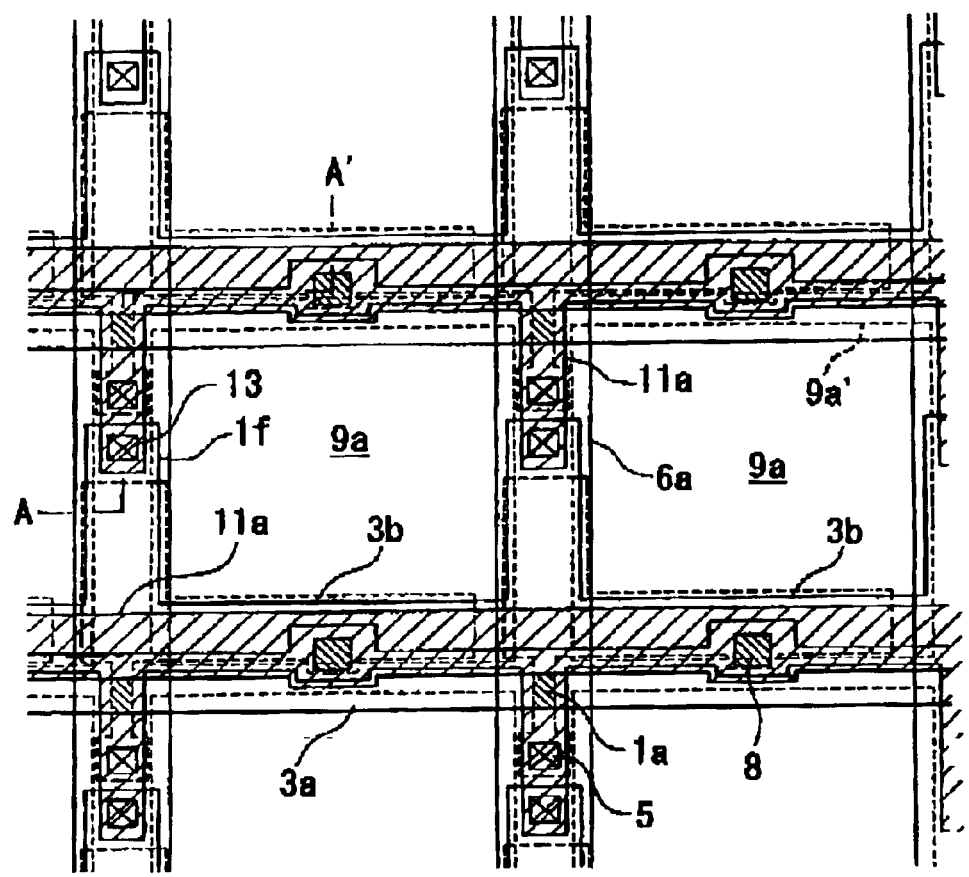
FIG. 2 is an enlarged plan view showing a plurality of pixel groups neighboring to each other of a TFT array substrate having a data line, scanning line, pixel electrode, and light-shielding layer formed therein.
Figure 3:
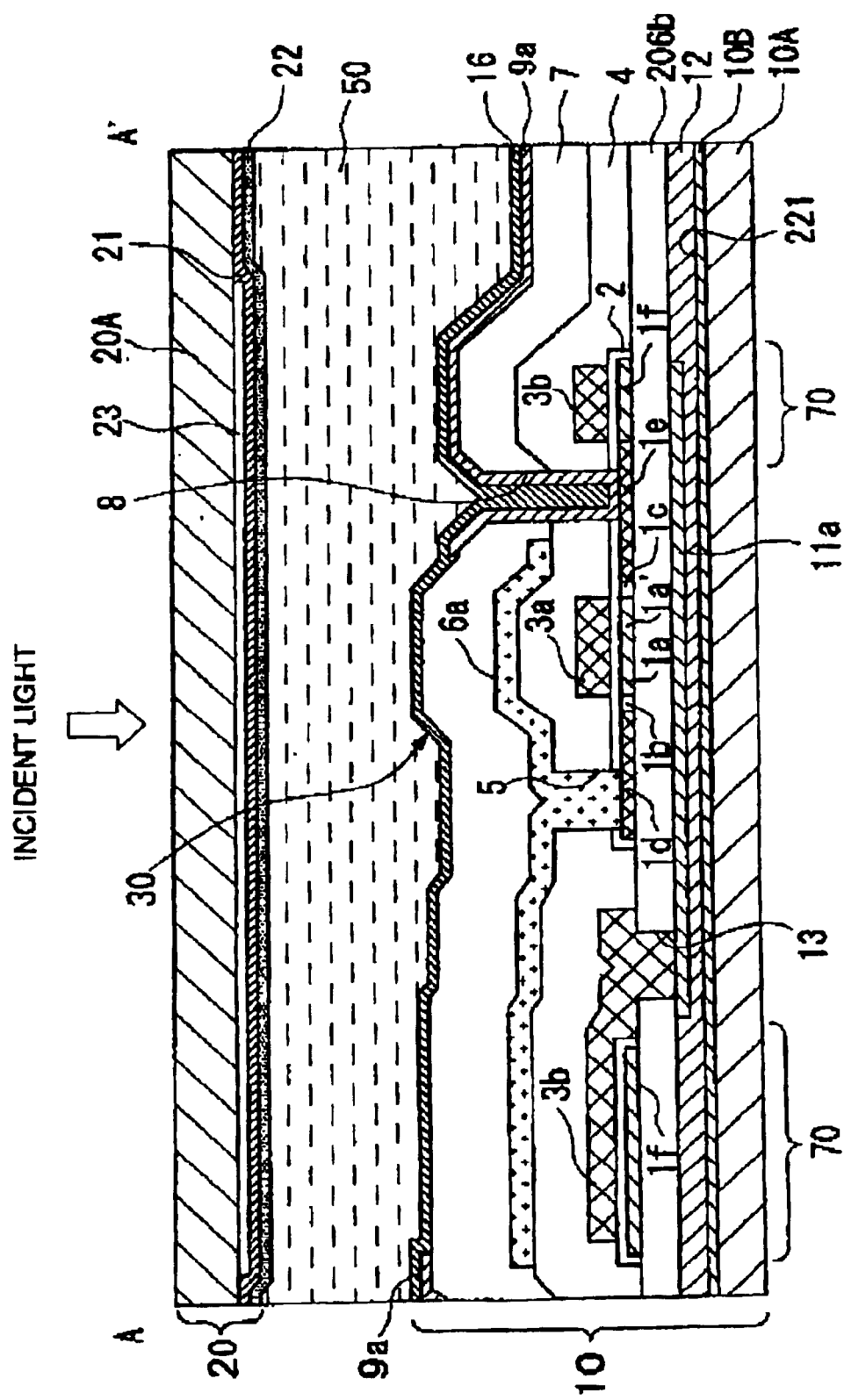
FIG. 3 is a sectional view taken along plane A–A' of FIG. 2.
Figure 5:
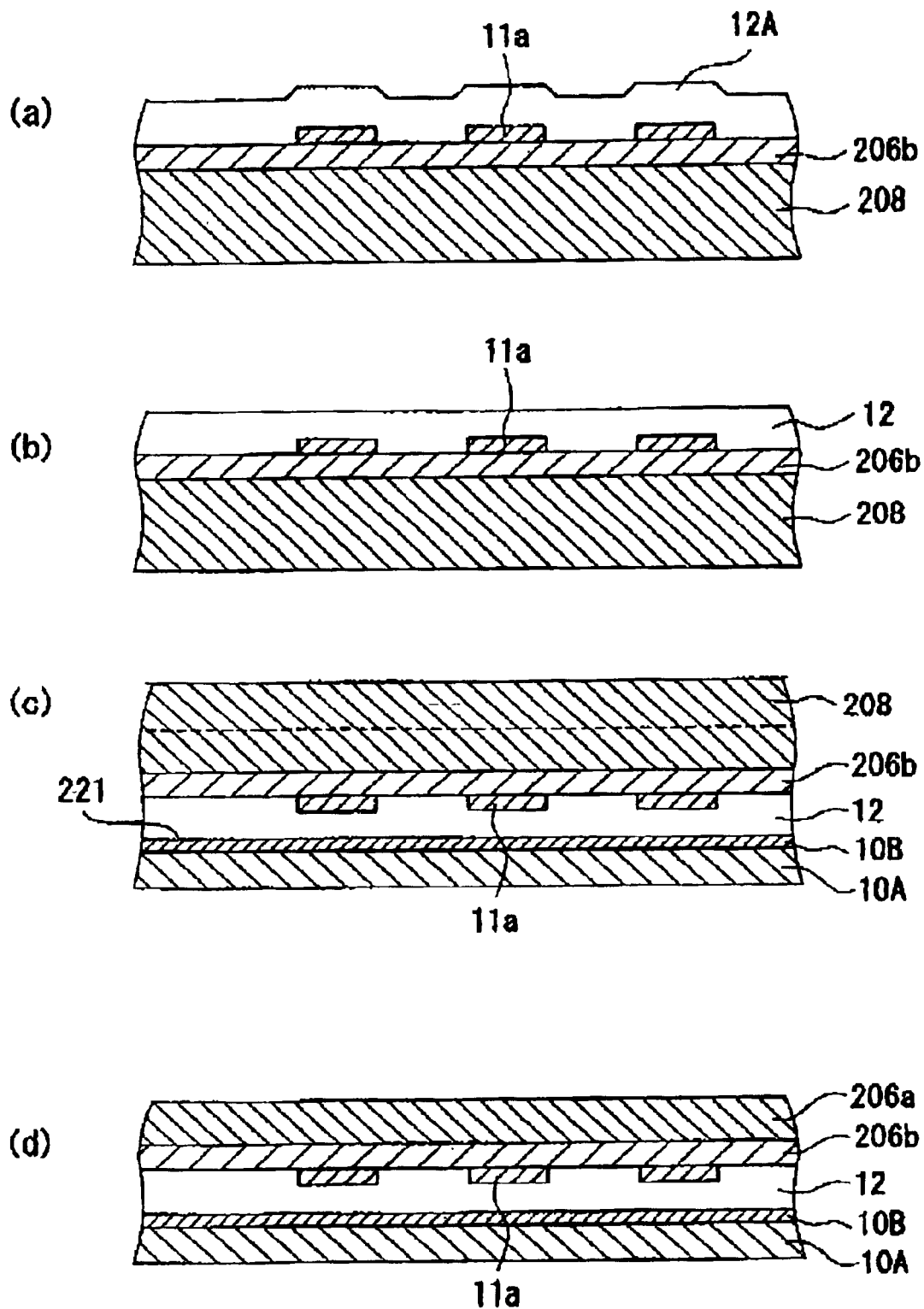
FIGS. 5(a)–5(d) are schematics of the manufacturing process of the liquid crystal apparatus according to the embodiment (Part 2)
Figure 7:
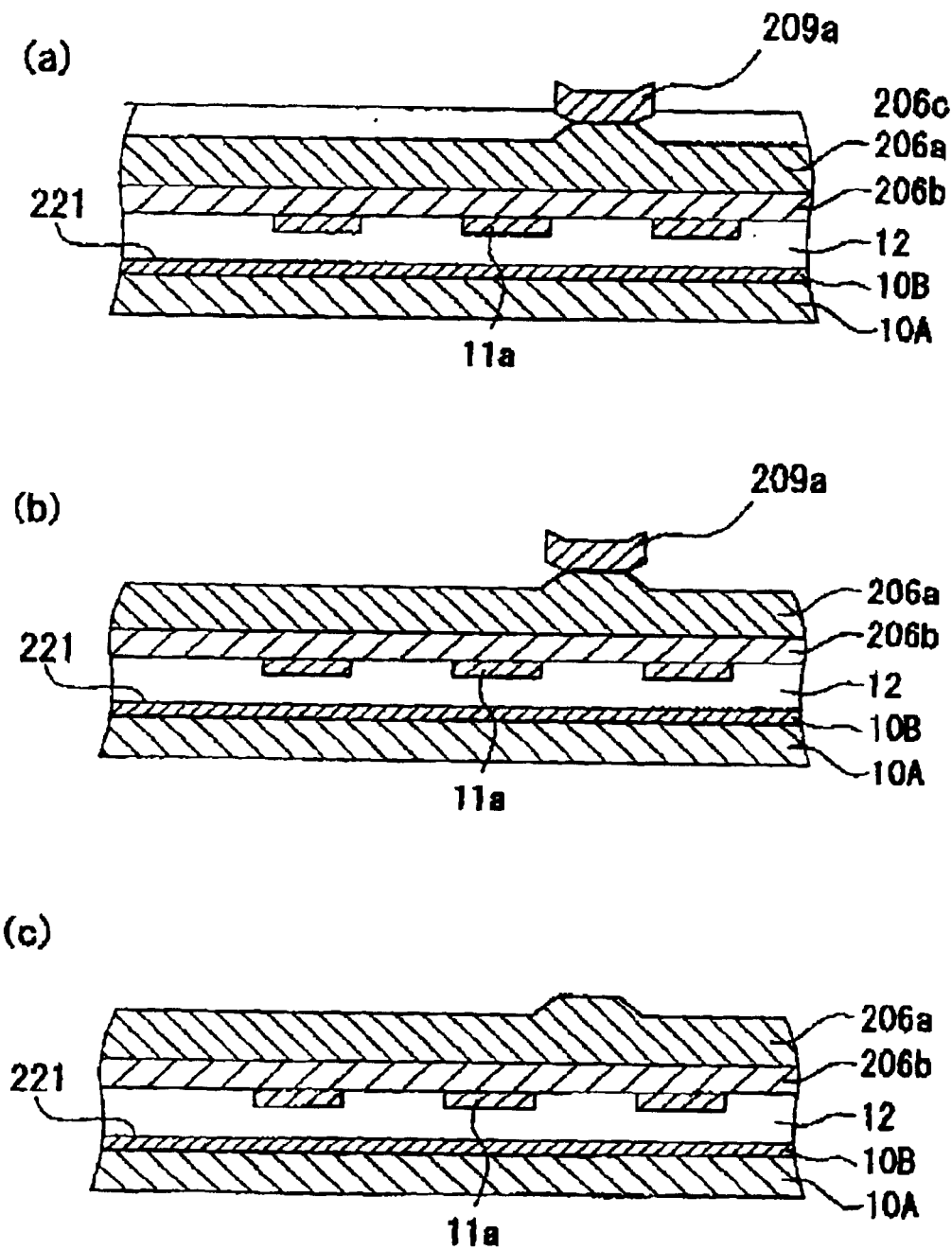
FIGS. 7(a)–7(d) are schematics of the manufacturing process of the liquid crystal apparatus according to the embodiment (Part 4)
Figure 10:
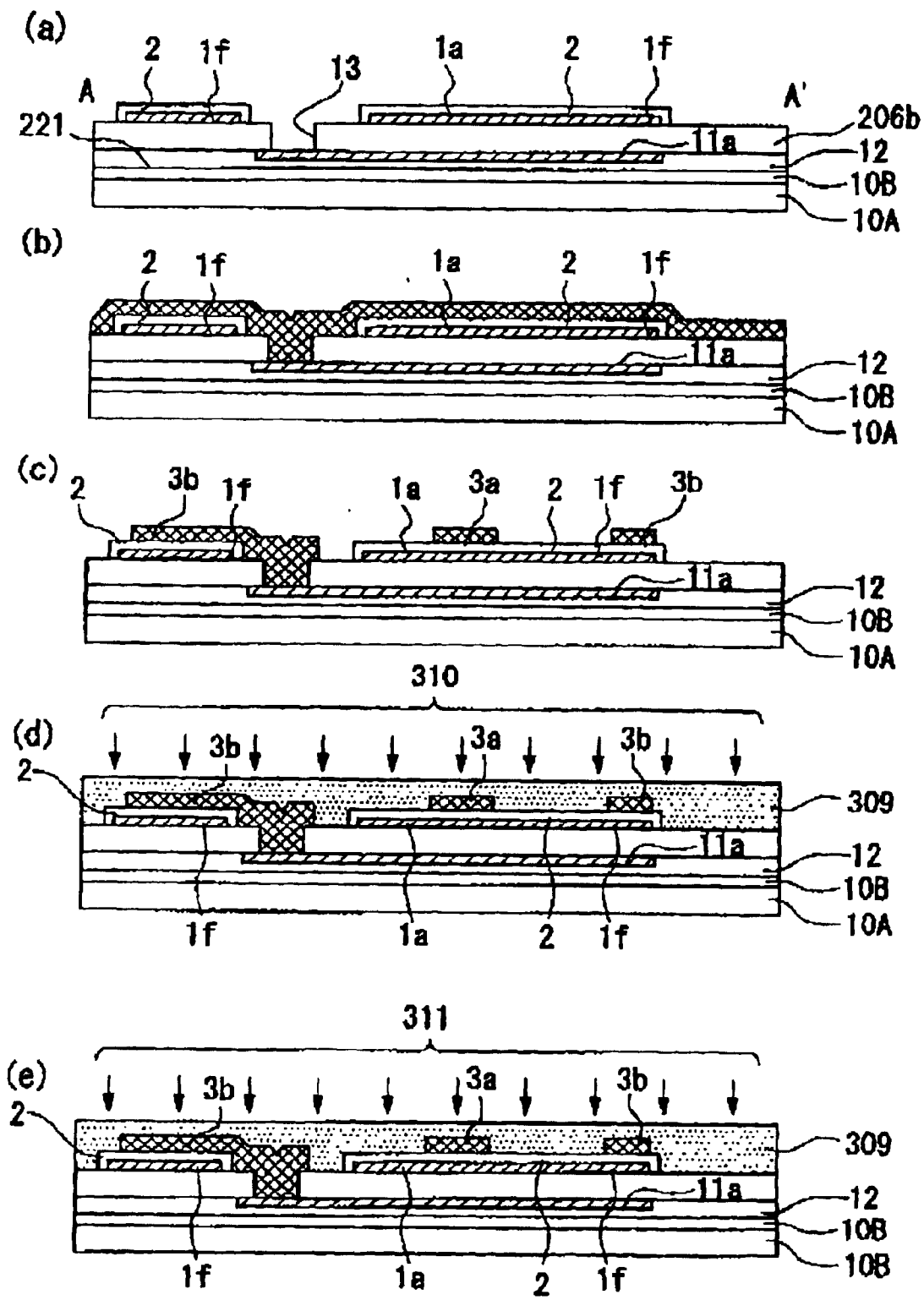
FIGS. 10(a)–10(e) are schematics of the manufacturing process of the liquid crystal apparatus according to the embodiment (Part 7)
Figure 11:
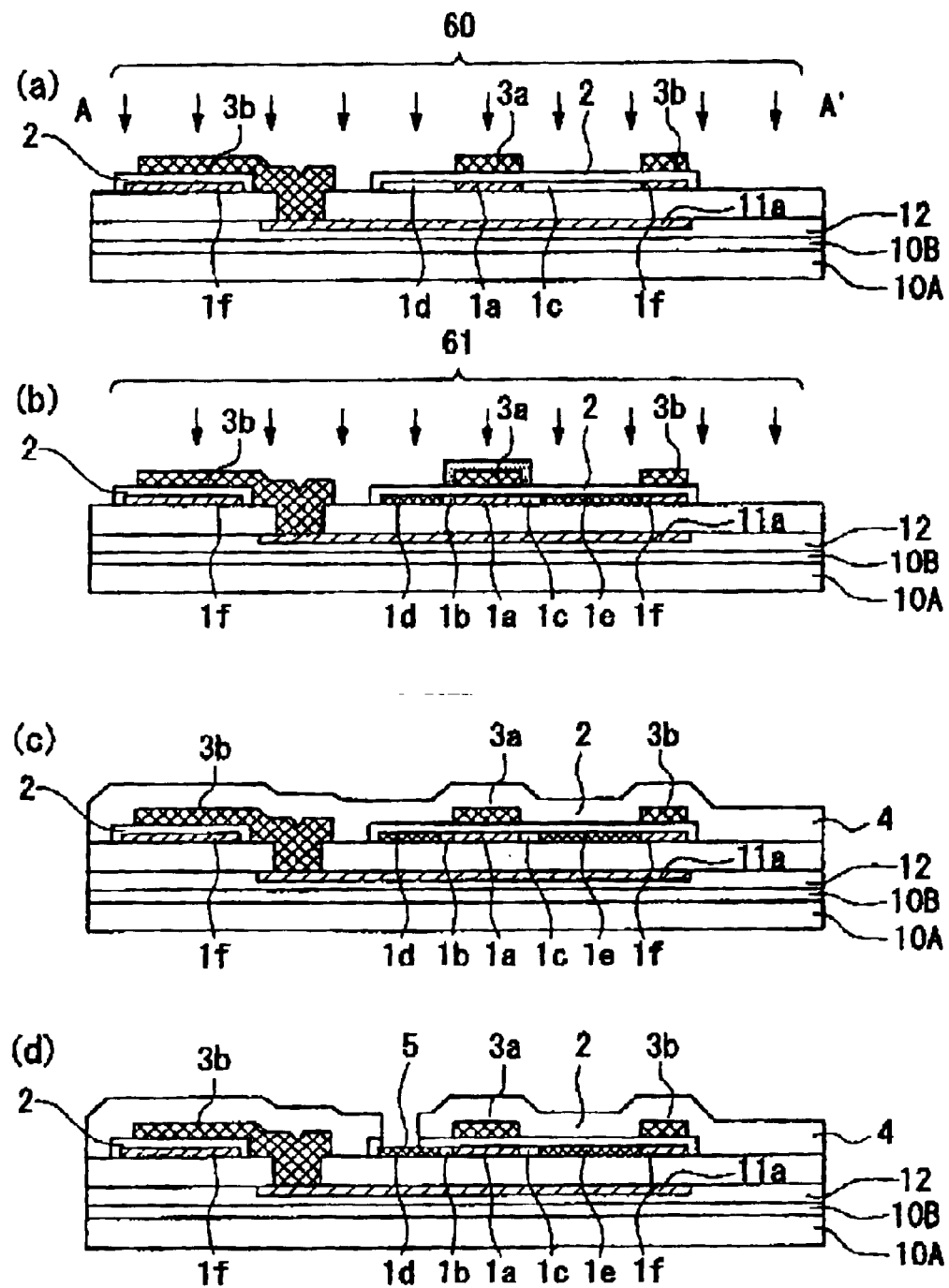
FIGS. 11(a)–11(d) are schematics of the manufacturing process of the liquid crystal apparatus according to the embodiment (Part 8)

FIG. 1 is a schematic that shows an equivalent circuit of various elements and wiring in a plurality of pixels formed in a matrix arrangement so as to form a pixel part (display region) of a liquid crystal apparatus. FIG. 2 is an enlarged plan view showing plural neighboring pixel groups of a TOT array substrate having a data line, scanning line, pixel electrode, light-shielding layer, and so forth formed thereon. FIG. 3 is a sectional view taken along plane A–A' of FIG. 2.

In addition, in FIGS. 1 to 3, in order to provide a recognizable size of each layer and member in the drawings, the contraction scale is drawn to be different for each layer and member.

Referring to FIG. 1, the plural pixels formed in a matrix arrangement and constituting the pixel pan of the liquid crystal apparatus include plural pixel electrodes 9a formed in a matrix arrangement and pixel switching TFTs (transistor elements) 30 to control the pixel electrodes 9a, and data lines 6a, to which image signals are supplied, are electrically connected to sources of the pixel switching TFTs 30. The image signals S1, S2, . . . , Sn to write in the data lines 6a may be supplied in this line order or may be supplied to plural neighboring data lines 6a for each group. To gates of the pixel switching TFTs 30, scanning lines 3a are electrically connected so that scanning signals G1, G2, . . . , Gm are applied in pulses to the scanning lines 3a at a predetermined timing in this line order.

The pixel electrodes 9a are electrically connected to drains of the pixel switching TFTs 30, and by closing the switch of the pixel switching TFTs 30, which are the switching elements, for a predetermined period, the image signals S1, S2, . . . , Sn supplied from the data lines 6a are written at a predetermined timing. The image signals S1, S2, . . . , Sn with a predetermined level, which are written into the liquid crystal via the pixel electrodes 9a, are maintained for a predetermined period between counter electrodes, which will be described below, formed on a counter substrate, which will also be described below.

In order to reduce or prevent the reduction in contrast ratio due to leak of the maintained image signals, and a display defect such as flickering called flicker, a storage capacitor 70 is added in parallel to a liquid crystal capacitor produced between the pixel electrode 9a and the counter electrode. For example, the voltage of the pixel electrode 9a is maintained by the storage capacitor 70 for a longer period than the time, for which the voltage is applied to the data line, by three-digit order of magnitude. Therefore, maintaining characteristics are further enhanced, achieving the electric optical apparatus with a high contrast ratio. According to the embodiment, in order to form such a storage capacitor 70, capacitance lines 3b reduced in resistance are arranged in the same layers of the scanning lines or by using the conductive light-shielding layer, as will be described below.

Next, referring to FIG. 2, a planar structure within a forming region (pixel part) of the transistor element on the TFT array substrate will be described in detail. As shown in FIG. 2, within the forming region (pixel part) of the transistor element on the TFT array substrate of the electric optical apparatus, the plural transparent pixel electrodes 9a (outline shown by the dotted fines 9a') are arranged in a matrix arrangement. Along the length and breadth boundaries of the pixel electrode 9a, the data line 6a, scanning line 3a, and capacitance line 3b are respectively arranged. The data line 6a is electrically connected to a source region, which will be described below, in a semiconductor layer 1a via a contact hole 5 while the pixel electrode 9a is electrically connected to a drain region, which will also be described below, in the semiconductor layer 1a through a contact hole 8. The scanning line 3a is arranged so as to oppose a channel region (region indicated by upward hatched lines in FIG. 2) in the semiconductor layer 1a, and functions as a gate electrode.

Referring to FIG. 2, in the regions indicated by upward hatched lines, plural light-shielding layers 11a are provided. More specifically, each of the light-shielding layers 11a is arranged at a position covering the pixel switching TFT 30 including the channel region of the semiconductor layer 1a in the pixel part from the side viewed from a substrate body, which will be described below, of the TFT array substrate. Furthermore, the light-shielding layer 11a includes a main-line part linearly expanding along the scanning line 3a so as to oppose a main-line part of the capacitance line 3b and a protruding part protruding along the data line 6a toward a neighboring column (i.e., downward in FIG. 2) from a position intersecting with the data line 6a The end of the downward protruding part in each column (pixel column) of the light-shielding layer 11a is overlapped with the end of the upward protruding part of the capacitance line 3b in the next column under the data line 6a. The overlapped position is provided with a contact hole 13 to electrically connect the light-shielding layer 11a to the capacitance line 3b. That is, according to the embodiment, the light-shielding layer 11a is electrically connected to the capacitance line 3b in the upward or downward column by the contact bole 13.

According to the embodiment, the pixel electrode 9a, pixel switching TFT 30, and light-shielding layer 11a are provided only within the pixel part.

Next, referring to FIG. 3, a sectional structure within the pixel part of the liquid crystal apparatus will be described.

A TFT array substrate 10 principally includes a supporting substrate 10A made of quartz, the pixel electrode 9a formed on the front surface of the supporting substrate 10A in the side of a liquid crystal layer 50, the pixel switching TFT (transistor element) 30, and an orientation film 16. A counter substrate 20 principally includes a substrate body 20A made of an optically-transparent substrate such as transparent glass or quartz, a counter electrode (common electrode) 21 formed on the front surface of the substrate body 20A in the side of the liquid crystal layer 50, and an orientation film 22.

On the front surface of the supporting substrate 10A of the TFT array substrate 10 in the side of the liquid crystal layer 50, the pixel electrode 9a is provided, and in the side of the liquid crystal layer 50, the orientation film 16 processed by predetermined aligning treatment such as rubbing treatment is arranged. The pixel electrode 9a is made of a transparent conductive thin-film, such as ITO (indium tin oxide), which the orientation film 16 is made of an organic thin-film, such as polyimide.

On the front surface of the supporting substrate 10A in the side of the liquid crystal layer 50, as shown in FIG. 3, the pixel switching TFT 30 to switch controlling each pixel electrode 9a is provided at a position adjacent to each pixel electrode 9a.

On the other hand, on the entire front surface of the substrate body 20A of the counter substrate 20 in the side of the liquid crystal layer 50, the counter electrode (common electrode) 21 is formed and the orientation film 22 processed by predetermined align treatment, such as rubbing treatment, is arranged toward the liquid crystal layer 50. The counter electrode 21 is made of a transparent conductive thin-film such as ITO while the orientation film 22 is made of an organic thin-film such as polyimide.

On the front surface of the substrate body 20A in the side of the liquid crystal layer 50, as further shown in FIG. 3, a counter-substrate light-shielding layer 23 is provided in a region other than an open region of each pixel part. In such a manner, by arranging the counter-substrate light-shielding layer 23 toward the counter substrate 20, the incident light from the counter substrate 20 can be prevented from breaking into a channel region $1a'$ of the semiconductor layer $1a$ of the pixel switching TFT 30 or LDD (Lightly Doped Drain) regions $1b$ and $1c$, while contrast can be enhanced.

Between the TFT array substrate 10 and the counter substrate 20, which are configured in such a manner and arranged so that the pixel electrode $9a$ opposes the counter electrode 21, a space surrounded with a sealing compound (not shown) and formed between peripheries of both the substrates is filled with liquid crystal to form the liquid crystal layer 50.

The liquid crystal layer 50 is made of mixed liquid crystal of one kind or several kinds of nematic liquid crystal, for example, and has a predetermined aligned state by the orientation films 16 and 22 when the electric field from the pixel electrode $9a$ is not applied.

The TFT array substrate 10 uses a composite substrate formed by bonding a monocrystalline silicon substrate on the supporting substrate 10A. The boundary between a lower bonding film 10B arranged on the front surface of the supporting substrate 10A toward the liquid crystal layer 50 and an upper bonding film 12 (equivalent to "a second insulator layer") arranged on the lower bonding film 10B is a bonding interface between the top of the supporting substrate 10A and the semiconductor substrate.

The light-shielding layer $11a$ is embedded at a position corresponding to each of the pixel switching TFTs 30 on the front surface of the upper bonding film 12. The light-shielding layer $11a$, as will be described below, is formed on the surface of a monocrystalline silicon substrate, on which the supporting substrate 10A is bonded, and then, it is formed on the supporting substrate 10A by bonding the monocrystalline silicon substrate 208 on the supporting substrate 10A, so that the light-shielding layer $11a$ is put into an embedded state by the upper bonding film 12 formed on the monocrystalline silicon substrate, on which the light-shielding layer $11a$ is arranged, so as to cover the light-shielding layer $11a$.

Also, the light-shielding layer $11a$ is preferably made of a metallic element, alloy, and metallic silicide including at least one of Ti, Cr, W, Ta, Mo, and Pd, which are high-melting point opaque metals.

By forming the light-shielding layer $11a$ of such materials, the light-shielding layer $11a$ can be prevented from being broken and melted by high-temperature treatment in the forming process of the pixel switching TFT 30, performed after the forming process of the light-shielding layer $11a$ on the front surface of the supping substrate 10A on the TFT array substrate 10.

According to the embodiment, the light-shielding layer $11a$ is formed on the TFT array substrate 10 in such a manner, so that the returned light from the TFT array substrate 10 can be prevented from entering the channel region $1a'$ or LDD regions $1b$ and $1c$ of the pixel switching TFT 30, and the characteristics of the pixel switching TFT 30 as a transistor element can be prevented from deteriorating because of the production of a photoelectric current.

Also, on the upper bonding film 12 and the light-shielding layer $11a$, a first interlayer insulator $206b$ (equivalent to "a first insulator layer") is formed. The first interlayer insulator $206b$ is to electrically insulate the semiconductor layer $1a$ making up the pixel switching TFT 30 from the light-shielding layer $11a$, and is formed on the entire front surface of the supporting substrate 10A.

By arranging the first interlayer insulator $206b$ on the front surface of the TFT army substrate 10 in such a manner, the light-shielding layer $11a$ can also be prevented from contaminating the pixel switching TFT 30, etc.

The thickness of the first interlayer insulator $206b$ is between 30 nm and 200 nm, and more preferably, the range may be between 50 nm and 100 nm.

The thicknesses below 30 nm of the first interlayer insulator $206b$ are not preferable because the insulation between the semiconductor layer and the light-shielding layer may not be secured. When the thickness of the first interlayer insulator $206b$ is within 200 nm, the light-shielding layer can be actively used as backgating.

According to the embodiment, the light-shielding layer $11a$ (and the capacitance line $3b$ to be electrically connected thereto) are at a constant potential by being electrically connected to a potentiostatic source via the contact hole 13, which passes through the first interlayer insulator $206b$ to the light-shielding layer $11a$. Therefore, changes in potential of the light-shielding layer $11a$ cannot have some adverse effect on the pixel switching TFT 30 arranged to oppose the light-shielding layer $11a$. Also, the capacitance line $3b$ can be preferably operated as a second storage-capacitor electrode of the storage capacitor 70.

As the potentiostatic source, there may be potentiostatic sources, such as a negative power supply and positive power supply to supply the power to peripheral circuits (a scanning-line driving circuit and data-line driving circuit, etc., for example) to drive the electric optical apparatus according to the embodiment, a grounding source, and a potentiostatic source to supply the power to the counter electrode 21. When using power sources of the peripheral circuits in such a manner, the light-shielding layer $11a$ and the capacitance line $3b$ can be maintained at a constant potential without any dedicated potential wiring or external input terminals.

When a variable voltage is applied to the light-shielding layer $11a$, an off current can be reduced or an on-state current can be increased by controlling the potential of the light-shielding layer $11a$.

According to the embodiment, the storage capacitor 70 is configured by a gate insulator 2, which extends from a position opposing the scanning line $3a$ to be used as a dielectric filers a first storage-capacitor electrode $1f$ extended from the semiconductor layer $1a$, and further a second storage-capacitor electrode, which is a part of the capacitance line $3b$ opposing the gate insulator 2 and the first storage-capacitor electrode $1f$.

More specifically, a heavily doped drain region $1e$ of the semiconductor layer $1a$ is arranged under the data line $6a$ and the scanning line $3a$ to extend and oppose a part of the capacitance line $3b$ extending along the same data line $6a$ and the scanning line $3a$ with the insulator 2 therebetween so as to give the first storage-capacitor electrode (semiconductor layer) $1f$. In particular, the insulator 2 as a dielectric of the storage capacitor 70 is no other than the gate insulator 2 of the pixel switching TFT 30 formed on the monocrystalline semiconductor layer by high temperature oxidation so as to give a thin and high-voltage insulator, enabling the storage capacitor 70 to be configured as a large capacity storage-capacitor with a comparatively small area.

Furthermore, the storage capacitor 70, as is understood from FIGS. 2 and 3, is configured to have a more storage-capacitor added thereto by arranging the light-shielding layer 11a as a third storage-capacitor electrode to oppose the first storage-capacitor electrode 1f with the first interlayer insulator 206b therebetween in the opposite side of the capacitance line 3b as a second storage-capacitor electrode (see the storage capacitor 70 in the right of FIG. 3). That is, according to the embodiment, a double storage-capacitor structure is constructed to have the storage capacitor added to both sides thereof with the first storage-capacitor electrode 1f therebetween so as to further increase the storage capacitor. Such a structure enhances the function to prevent the flicker and burn-in in the display image, which is contained in the electric optical apparatus according to the embodiment.

As a result, by efficiently using spaces deviated from aperture regions, such as a region under the data line 6a and a region, in which the disclination of liquid crystal is produced along the scanning line 3a, (i.e., the region having the capacitance line 3b formed therein), the storage capacitance of the pixel electrode 9a can be increased.

Next, referring to FIG. 3, the pixel switching TFT 30 is a perfect depletion-mode N-type transistor. The film thickness of the semiconductor layer 1a is between 30 nm and 100 nm, and more preferably, it may be constant in the range between 40 nm and 60 nm. When the film thickness of the semiconductor layer 1a is 100 nm or less, the pixel switching TFT 30 becomes of a perfect depletion-mode because a depletion layer controlled by a gate electrode extends largely more than the semiconductor layer 1a and independently from the impurity concentration of a channel region.

The pixel switching TFT 30 having an LDD (Lightly Doped Drain) structure includes the scanning line 3a, a channel region 1a' of the semiconductor layer 1a having a channel formed by an electric field from the scanning line 3a, the gate insulator 2 to insulate the semiconductor layer 1a from the scanning line 3a, the data line 6a, the lightly doped source region (LDD region in the source side) 1b and the lightly doped drain region (LDD region in the drain side) 1c of the semiconductor layer 1a, and a heavily doped source region 1d and a heavily doped drain region 1e of the semiconductor layer 1a.

Since the thickness of the semiconductor layer 1a is 30 nm or more, and preferably, it may be 40 nm or more, variation in transistor characteristics, such as the threshold potential due to the film thickness of the channel region 1a', can be reduced. Furthermore, since the thickness of the semiconductor layer 1a is 100 nm or less, and preferably, it may be 60 nm or less, even when the semiconductor layer 1a is irradiated with the stray light that cannot be prevented by the light-shielding layer 11a, the production of a photo-excited electron-hole pair can be suppressed to be small. Therefore, a photo-leak current can be reduced so that the pixel switching TFT 30 is effective as a switching element of the pixel.

The data line 6a is made of a light-shielding metallic thin-film, such as a metallic film of Al, etc., and an alloy film of metallic silicide, etc. On the scanning line 3a, gate insulator 2, and the first interlayer insulator 206b, a second interlayer insulator 4 having the contact hole 5 leading to the heavily doped source region 1d and the contact hole 8 leading to the heavily doped drain region 1c respectively formed therein. The data line 6a is electrically connected to the heavily doped source region 1d via the contact hole 5 leading to the source region 1d. Furthermore, on the data line 6a and the second interlayer insulator 4, a third interlayer insulator 7 having the contact bole 8 leading to the heavily doped drain region 1e formed therein. The pixel electrode 9a is electrically connected to the heavily doped drain region 1e via the contact hole 8 leading to the heavily doped drain region 1c. The pixel electrode 9a described above is arranged on the third interlayer insulator 7 formed in such a manner.

In addition, the pixel electrode 9a and the heavily doped drain region 1e may also be electrically connected to each other using an Al film equal to the data line 6a or a poly-semiconductor film equal to the scanning line 3b as intermediary.

The pixel switching TFT 30 preferably has the LDD structure described above. Alternatively, it may have an off-set structure, in which an impurity ion is not implanted to the lightly doped source region 1b and the lightly doped drain region 1c, or it may be a self-aligned type TFT, in which the heavily doped source and drain regions are formed in a self-aligned manner by implanting an impurity ion with high concentration using the gate electrode 3a as a mask.

Also, a single gate structure is adopted, in which only one gate electrode (scanning line) 3a of the pixel switching WT 30 is arranged between the source and drain regions 1b and 1e. Alternatively, two or more gate electrodes may be arranged therebetween. At this time, the same signal is to be applied to individual gate electrodes. When configuring the TFT with the double gate or triple gate or more, the leak current at the junction between the channel and source-drain regions can be prevented, enabling the off-state current to be reduced. When at least one of these gate electrodes is to be of the LDD or offset structure the off-state current can be further reduced, obtaining a stable switching element.

In general, in the monocrystalline semiconductor layer such as the channel region 1a', the lightly doped source region 1b, and the lightly doped drain region 1c of the semiconductor layer 1a, when light comes in, a photoelectric current must be produced by the photoelectric transfer effect included in the semiconductor so as to deteriorate transistor characteristics of the pixel switching TFT 30. Whereas, according to the embodiment, since the data line 6a is formed of a light-shielding metallic thin-film, such as Al, so as to cover the scanning line 3a from the top, at least the channel region 1a' and the LDD regions 1b and 1c of the semiconductor layer 1a can be effectively protected from incident light.

As described above, under the pixel switching TFT 30, the light-shielding layer 11a is arranged, so that at least the channel region 1a', the lightly doped source region 1b, and the lightly doped drain region 1c of the semiconductor layer 1a can also be effectively protected from incident returned light. Furthermore, even when the leak light from the structure comes in, because of the thin semiconductor layer 1a of the pixel switching TFT 30, the light leak can be sufficiently suppressed.

In addition, according to the embodiment, the semiconductor layer 1a is not limited to the monocrystalline semiconductor, and the polycrystalline semiconductor can of course incorporate the same structure.

Next, a manufacturing method of the electric optical apparatus having the structure described above will be described with reference to FIGS. 4(a) to 13(c).

First, a manufacturing method of the TFT array substrate 10 will be described with reference to FIGS. 4(a) to 13(c).

Incidentally, FIGS. 4(a) to 8(b) and FIGS. 9(a) to 13(c) are indicated with different reduced scales to enhance their viewability.

First, FIG. 4(a)shows the monocrystalline silicon substrate 208 (equivalent to "a semiconductor substrates") made of a monocrystalline silicon layer (equivalent to "a semiconductor layer") with a thickness of 600 μm approximately, for example. On the surface of the monocrystalline silicon substrate 208, on which the supporting substrate 10A is bonded, the first interlayer insulator 206b (equivalent to "a first insulator layer") made of silicon oxide is formed in advance.

The first interlayer insulator 206b is made by oxidation of the surface of the monocrystalline silicon substrate 208, and the thickness of the first interlayer insulator 206b is between 30 nm and 200 nm, and more preferably, the range may be between 50 nm and 100 nm.

A hydrogen ($H^+$) is implanted into the surface of the monocrystalline silicon substrate 208, on which the supporting substrate 10A is bonded, at an accelerating voltage of 100 keV and a dose amount of $10 \times 10^{16}/cm^2$, for example.

Next, as shown in FIG. 40), on the first interlayer insulator 206b of the monocrystalline silicon substrate 208, a metallic element, alloy, and metallic suicide including at least one of Ti, Cr, W, Ta, Mo, and Pd are heaped up by sputtering, a CVD (chemical vapor deposition) method, or electron-beam-heated deposition method to have a film thickness of 150 to 200 nm, for example, so as to form a light-shielding layer 11.

Then, on the entire surface of the monocrystalline silicon substrate 208, a photo resist is formed; and the photo resist is exposed by using a photo mask having the pattern of the light-shielding layer 11a to be finally formed (see FIG. 2). Thereafter, as shown in FIG. 4(c), by developing the photo resist, a photo resist 207 having the pattern of the light-shielding layer 11a to be finally formed is formed.

Next, the light-shielding layer 11 is etched by using the photo resist 207 as a mask, and then, as shown in FIG. 4(d), by delaminating the photo resist 207, the light-shielding layer 11a having a predetermined pattern is formed on the surface of the monocrystalline silicon substrate 208. The film thickness of the light-shielding layer 11a may be tom 150 to 200 nm, for example.

Then, as shown in FIG. 5(a), on the surface of the monocrystalline silicon substrate 208 having the light-shielding layer 11a formed thereon, an insulator layer 12A to be the upper bonding film 12 (equivalent to "a second insulator layer") made of $SiO_2$ is formed by the CVD method or the like. The film thickness of the insulator layer 12A is set at least to be larger than the film thickness of the light-shielding layer 11a. For example, it may preferably be approximately from 400 to 1200 nm, and more preferably, it may approximately be from 1000 to 1200 nm.

Next, as shown in FIG. 5(b), the surface of the insulator layer 12A located above the light-shielding layer 11a is polished and flattened by using a CMP (Chemical Mechanical Polishing) method, so that the upper bonding film 12 constituting the bonding boundary to the supporting substrate 10A is formed. The film thickness of the upper bonding film 12 may be from 400 to 600 nm, for example.

As described above, the monocrystalline silicon substrate 208 having the first interlayer insulator 206b, the light-shielding layer 11a, and the upper bonding film 12 is formed.

Then, as shown in FIG. 5(c), the supporting substrate 10A and the monocrystalline silicon substrate 208 are bonded together so as to form a composite substrate.

On the surface of the supporting substrate 10A used here, on which the monocrystalline silicon substrate 208 is bonded, the lower bonding film 10B constituting a bonding boundary 221 to the monocrystalline silicon substrate 208 is formed in advance. The lower bonding film 10B, in the same way as the upper bonding film 12, is made of $SiO_2$ and formed by the CVD method or the like.

The supporting substrate 10A and the monocrystalline silicon substrate 208 are bonded together in a state that the lower bonding film 10B of the supporting substrate 10A opposes the upper bonding film 12 of the monocrystalline silicon substrate 208, so that the boundary between the lower bonding film 10B and the upper bonding film 12 is the bonding boundary 221.

The bonding between the supporting substrate 10A and the monocrystalline silicon substrate 208 is performed by the heat treatment at 30° C. for 2 hours, for example. In order to further increase the bonding strength between the supporting substrate 10A and the monocrystalline silicon substrate 208, it is necessary to increase the heat-treatment temperature to 450° C., approximately. However, because the difference in the thermal expansion coefficient between the supporting substrate 10A made of quartz, etc., and the monocrystalline silicon substrate 208 is large, when further heating them in a state that the supporting substrate 10A and the monocrystalline silicon substrate 208 are bonded together, a defect such as cracks in a monocrystalline silicon layer of the monocrystalline silicon substrate 208 is generated, so that the quality of the TFT array substrate 10 to be manufactured may be deteriorated.

In order to suppress the production of the defect such as cracks, it is preferable that the monocrystalline silicon substrate 208, on which the beat treatment for the bonding has been once performed at 300° C., be reduced in thickness to 100 to 150 mμapproximately by wet etching or the CMP method, and then the beat treatment be performed thereon at high temperature so as to increase the bonding strength. Specifically, it is preferable to increase the bonding strength by bonding the monocrystalline silicon substrate 208 on the supporting substrate 10A by the beat treatment at 300° C., etching the monocrystalline silicon substrate 208 by using KOH aqueous solution at 80° C. to reduce it in thickness to 150 μm, and then by performing the heat treatment thereon again at 450° C., for example.

Next, part of the monocrystalline silicon layer of the monocrystalline silicon substrate 208 is delaminated by the heat treatment on the monocrystalline silicon substrate 208 so as to form a thin-film monocrystalline silicon layer 206a on the supporting substrate 10A, as shown in FIG. 5(d).

The delamination of the monocrystalline silicon layer is produced by the segmentation of semiconductor connection in one layer of the monocrystalline silicon substrate 208 in the vicinity of the surface due to a hydrogen ion implanted in the monocrystalline silicon substrate 208 in advance.

The heat treatment for delaminating the monocrystalline silicon layer may be performed by heating it to 600° C. at a temperature-programming rate of 20° C./minute. By this heat treatment, part of the monocrystalline silicon layer of the monocrystalline silicon substrate 208 is separated.

In addition, the film thickness of the thin-film monocrystalline silicon layer 206a can be arbitrarily changed within the range of 50 nm to 3000 nm by changing the accelerating voltage of the hydrogen ion implantation performed on the monocrystalline silicon substrate 208.

In addition, the thin-film monocrystalline silicon layer 206a may also be obtained by methods in addition to the method described above, such as a PACE (Plasma Assisted Chemical Etching) method to etch the monocrystalline silicon substrate 208 alter polishing the surface thereof to a film thickness of 3 to 5 μm and an ELTRAN (Epitaxial Layer Transfer) method to relocate an epitaxial semiconductor layer formed on a porous; semiconductor onto a bonding substrate by selective etching of a porous semiconductor layer.

Next referring to FIGS. 6(a)–7(c), a process, in which the thin-film monocrystalline silicon layer 206a is thermally oxidized to form an oxide film 206c and the oxide film 206c is removed by wet etching, will be described. This process is to control the film thickness of the thin-film monocrystalline silicon layer 206a constituting the pixel switching TFT 30.

First, as shown in FIG. 6(a), on the entire surface of the supporting substrate 10A, a silicon nitride film 209 is formed to have a thickness of 100 nm to 300 nm approximately by the reaction between dichlorosilane and ammonia using a low pressure chemical vapor deposition method (LPCVD method).

Then, as shown in FIG. 6(b), on the silicon nitride film 209, a photo resist 205 is formed. Then, the photo resist 205 located on end faces of the supporting substrate 10A is removed so that the photo resist 205 formed on the end faces of the supporting, substrate 10A is not delaminated during transportation, etc. The removal of the photo resist 205 may be performed by exposing the end faces of the supporting substrate 10A with light or by using alkaline solution, such as aqueous solution of potassium hydrate.

Next, as shown in FIG. 6(c), the photo resist 205 is exposed to light and developed by using a photo-mask so as to form a photo resist 205a having a pattern covering regions other than the region, on which a perfect depletion-mode transistor will be produced.

Then, the silicon nitride film 209 is etched by wet etching using the photo resist 205a as a mask. Then, by removing the photo resist 205a, as shown in FIG. 6(d), a selective oxidation mask-pattern 209a covering regions other than the region, on which the perfect depletion-mode transistor will be produced, is formed on the thin-film monocrystalline silicon layer 206a.

Next, as shown in FIG. 7(a), the thin-film monocrystalline silicon layer 206a formed on the region not covered with the selective oxidation mask-pattern 209a is locally grown by thermal oxidation to form an oxide film 206c. The film thickness of the oxide film 206c is preferably 700 nm approximately when the film thickness of the thin-film monocrystalline silicon layer 206a is approximately 400 nm, for example.

Next, as shown in FIG. 7(b), the oxide film 206b is removed by wet etching. Then, as shown in FIG. 7(c), the selective oxidation mask-pattern 209a is removed by a method using hot phosphoric acid or dry etching such as reactive etching or reactive ion-beam etching so as to form the thin-film monocrystalline silicon layer 206a in the region, on which the perfect depletion-mode transistor will be produced to have a constant film thickness within the range of 30 nm to 100 nm.

Next, as shown in FIG. 8(a), the semiconductor layer 1a with a predetermined pattern is formed by a photolithographic process or an etching process. That is, in regions, in which the capacitance line 3b is formed under the data line 6a and the capacitance line 3b is formed along the scanning line 3a, the first storage-capacitor electrode 1f extended from the semiconductor layer 1a constituting the pixel switching TFT 30 is formed. Incidentally, FIGS. 8(a) and 8(b) do not show the first storage-capacitor electrode 1f.

Next, as shown in FIG. 8b), the semiconductor layer 1a is thermally oxidized approximately at a temperature of 850 to 1300° C., preferably at 1000° C. approximately, for about 72 minutes so as to form the gate insulator 2 by forming a thermally-grown oxide semiconductor film with a comparatively thin thickness of about 60 nm. As a result, thicknesses of the semiconductor layer 1a and the gate insulator 2 are approximately 30 to 170 nm and 60 nm, respectively.

Then, referring to FIGS. 9(a) to 13(c), a method for manufacturing the TFT array substrate 10 from the supporting substrate 10A having the gate insulator 2 formed thereon will be described. Incidentally, FIGS. 9(a) to 13(c) are process drawings shoving part of the TFT array substrate by corresponding to the sectional view shown in FIG. 3. FIGS. 9(a) to 13(c) are shown in the contraction scale different from FIGS. 4(a) to 8(b).

As shown in FIG. 9(a), at a position corresponding to the N-channel semiconductor layer 1a on the supporting substrate 10A having the gate insulator 2 formed thereon, a resist film 301 is formed. The P-channel semiconductor layer 1a is doped with dopant 302 of a V-group element, such as P in small concentrations (with a P ion at an accelerating voltage of 70 keV and a dose amount of $2 \times 10^{11}/cm^2$ for example).

Then, as shown in FIG. 9(b), at a position corresponding to the P-channel semiconductor layer 1a (not shown), a resist film is formed, and the N-channel semiconductor layer 1a is doped with dopant 303 of a III-group element such as B in small concentrations (with a B ion at an accelerating voltage of 35 keV and a dose amount of $1 \times 10^{12}/cm^2$, for example).

Next, as shown in FIG. 9(c), at each of P- and N-channels, on the surface of the supporting substrate 10A other than end portions of the channel region 1a' of the semiconductor layer 1a, a resist film 305 is formed; the P-channel is doped with dopant 306 of a V-group element, such as P in the dose amount about 1 to 10 times as large as that of the process shown in FIG. 7(a); and the N-channel is doped with the dopant 306 of a M-group element such as B in the dose amount about 1 to 10 times as large as that of the process shown in FIG. 7(b).

Next, as shown in FIG. 9(d), in order to reduce the first storage-capacitor electrode 1f formed by extending the semiconductor layer 1a in electrical resistance, a resist film 307 (with a width larger than that of the scanning line 3a) is formed on the surface of the supporting substrate 10A at a position corresponding to the scanning line 3a (gate electrode); by using the resist film 307 as a mask, from the top surface thereof, the first storage-capacitor electrode 1f is doped with dopant 308 of a V-group element such as P in small concentrations (with a P ion at an accelerating voltage of 70 keV and a dose amount of $3 \times 10^{14}/cm^2$, for example).

Next, as shown in FIG. 10(a), by dry etching, such as reactive etching or reactive ion-beam etching, or wet etching, a contact bole 13 passing through the first interlayer insulator 206b toward the light-shielding layer 11a is formed.

When forming the contact bole 13, as shown in FIG. 10(a), as the contact hole 13 reaches the light-shielding layer 11a by passing through only the first interlayer insulator 206b, a bonding boundary 221 between the monocrystalline silicon substrate 20S and the supporting substrate 10A located between the lower bonding film 10B and the upper bonding film 12 is not necessary to be penetrated.

When forming the contact bole 13 by anisotropic dry etching, such as reactive etching or reactive ion-beam etching, the forming rather has the advantage to have the same aperture shape as a mask shape. However, when forming it by combination of the anisotropic dry etching with the wet etching, the contact hole 13 can be tapered so as to have the advantage to prevent breaking of wire during wiring.

Next, as shown in FIG. 10(b), after depositing a poly-semiconductor layer 3 by the low pressure CVD or the like to have a thickness of about 350 nm, phosphor (P) is thermally diffused so as to cause the poly-semiconductor layer 3 to have conductive properties. Alternatively, a dope semiconductor film having a P ion simultaneously doped with the forming of the poly-semiconductor layer 3 may also be used, thereby enhancing the conductivity of the poly-semiconductor layer 3.

Next, as shown in FIG. 10(c), the capacitance line 3b is formed together with the scanning line 3a with a predetermined pattern by a photolithographic process using a resist mask or an etching process. In addition, thereafter, the poly-semiconductor film remaining on the back surface of the supporting substrate 10A is removed by etching while covering the front surface of the supporting substrate 10A with a resist film.

Next, as shown in FIG. 10(d), in order to form a P-channel LDD region in the semiconductor layer 1a, a position corresponding to the N-channel semiconductor layer 1a is covered with a resist film 309. The resist film 309 is firstly doped using the scanning line 3a (gate electrode) as a diffusion mask with dopant 310 of a III-group element such as B in small concentrations (with a $BF_2$ ion at an accelerating voltage of 90 keV and a dose amount of $3 \times 10^{13}/cm^2$, for example) so as to form the P-channel lightly doped source region 1b and the lightly doped drain region 1c.

Successively, as shown in FIG. 10(e), in order to form the P-channel heavily doped source region 1d and the heavily doped drain region 1e on the semiconductor layer 1a, a position corresponding to the N-channel semiconductor layer 1a is covered with the resist film 309, while a resist layer is formed on the scanning line 3a corresponding to the P-channel with a mask (not shown) having a width larger than that of the scanning line 3a. In this state, the resist film 309 is doped with dopant 311 of a III-group element such as B in large concentrations (with a $BF_2$ ion at an accelerating voltage of 90 keV and a dose amount of $2 \times 10^{15}/cm^2$, for example).

Next, as shown in FIG. 11(a), in order to form an N-channel LDD region in the semiconductor layer 1a, a position corresponding to the P-channel semiconductor layer 1a is covered with a resist film (not shown). The resist film is doped using the scanning line 3a (gate electrode) as a diffusion mask with dopant 60 of a V-group element such as P in small concentrations (with a P ion at an accelerating voltage of 70 keV and a dose amount of $6 \times 10^{12}/cm^2$, for example) so as to form the N-channel lightly doped source region 1b and the lightly doped drain region 1c.

Successively, as shown in FIG. 11(b), in order to form the N-channel heavily doped source region 1d and the heavily doped drain region 1e on the semiconductor layer 1a, after a resist 62 is formed on the scanning line 3a corresponding to the N-channel with a mask having a width larger than that of the scanning line 3a, the resist 62 is doped wits dopant 61 of a V-group element such as P in large concentrations (with a P ion at an accelerating voltage of 70 keV and a dose amount of $4 \times 10^{15}/cm^2$, for example).

Next, as shown in FIG. 11(c), by using a normal or low pressure CVD method or TEOS (tetraethyl orthosilicate) gas, for example, a silicate glass film, such as NSC, PSG, BSG, and BPSG and the second interlayer insulator 4 made of a nitride semiconductor film or au oxide semiconductor film are formed so as to cover the capacitance line 3b and the scanning line 3a together with the scanning line 3a in the pixel switching TFT 30. The film thickness of the second interlayer insulator 4 is preferably about 500 to 1500 nm, and it is more preferably 800 nm.

Thereafter, in order to activate the heavily doped source region 1d and the heavily doped drain region 1e, anneal treatment is performed thereon at about 850° C. for about 20 minutes.

Next, as shown in FIG. 11(d), the contact hole 5 for a data line 31 is formed by dry etching such as reactive etching or reactive ion-beam etching, or wet etching. A contact hole for connecting the scanning line 3a and the capacitance line 3b to wiring (not shown) is also formed to pass through the second interlayer insulator 4 by the same process as that of the contact hole 5.

Next, as shown in FIG. 12(a), aft er a low-resistance metal such as shielding Al or metallic silicide is deposited on the second interlayer insulator 4 as a metallic film 6 by a sputtering treatment or the like to have a thickness of about 100 to 700 nm, preferably of about 350 nm, the data line 6a is formed by a photolithographic process or an etching process, as shown in FIG. 12(b).

Next, as shown in FIG. 12(c), by using a normal or low pressure CVD method or TEOS gas, for example, a silicate glass film, such as NSG, PSG, BSG, and BPSG, and the third interlayer insulator 7 made of a nitride semiconductor film or an oxide semiconductor film are formed so as to cover the data line 6a. The film thickness of the third interlayer insulator 7 is preferably about 500 to 1500 nm, and it is more preferably 800 nm.

Next, as shown in FIG. 13(a), in the pixel switching TFT 30, the contact hole 8 for electrically connecting the pixel electrode 9a to the heavily doped drain region 1c is formed by dry etching such as reactive etching or reactive ion-beam etching.

Next, as shown in FIG. 13(b), after a transparent conductive thin-film 9, such as ITO (Indium Tin Oxide), is deposited on the third interlayer insulator 7 by a sputtering treatment or the like to have a thickness of about 50 to 200 nm, the pixel electrode 9a is formed by a photolithographic process and an etching process, as shown in FIG. 13(c). In addition, when the electric optical apparatus according to the embodiment is a reflection electric optical apparatus, the pixel electrode 9a may be formed of an opaque material with high reflectance such as Al.

Successively, the pixel electrode 9a is coated with coating liquid of a polyimide orientation-film, and then an orientation film 16 is formed by a rubbing treatment in a predetermined direction to have a predetermined pre-tilt angle.

In such a manner, the TFT array substrate 10 shown in FIG. 3 is manufactured.

Next, a manufacturing method of the counter substrate 20 and a method for manufacturing a liquid crystal apparatus from the TFT array substrate 10 and the counter substrate 20 will be described.

In order to manufacture the counter substrate 20 shown in FIG. 3, an optically transparent substrate, such as a glass substrate, is prepared as the substrate body 20A so as to form the counter-substrate light-shielding layer 23 on the surface of the substrate body 20A. The counter-substrate light-shielding layer 23 is formed through a photolithographic process and an etching process after sputtering a metallic material, such as Cr, Ni, and Al. In addition, the counter-substrate light-shielding layer 23 may also be formed of a material such as resin black in which carbon and Ti, etc., are dispersed in a photoresist, in addition to the metallic material mentioned above.

Thereafter, a transparent conductive thin-film, such as ITO, is deposited on the entire surface of the substrate body 20A by a sputtering method, etc., to have a thickness of about 50 to 200 nm so as to form the counter electrode 21. Furthermore, after coating the entire surface of the counter electrode 21 with coating liquid of a polyimide orientation-film, the orientation film 22 is formed by a rubbing treatment in a predetermined direction to have a predetermined pre-tilt angle.

In such a manner, the counter substrate 20 shown in FIG. 1 is manufactured.

Finally, the TFT array substrate 10 and the counter substrate 20 manufactured as described above are bonded together with a sealing material so that the orientation film 16 and the orientation film 22 oppose each other. Then, a space between both the substrates is filled with mixed liquid crystal of several kinds of nematic liquid crystal, for example, by a vacuum suction method or the like so as to form the liquid crystal layer 50 with a predetermined thickness, thereby manufacturing the liquid crystal apparatus of the structure described above.

In the manufacturing method of the liquid crystal apparatus according to the embodiment, on the surface of the monocrystalline silicon substrate 208 on which the supporting substrate 10A is bonded the first interlayer insulator 206b, the light-shielding layer 11a, and the upper bonding film 12 are sequentially formed, and then the monocrystalline silicon substrate 208 is bonded on the supporting substrate 10A to form the composite substrate, so that the light-shielding layer 11a is located higher than the bonding boundary 221 between the supporting substrate 10A and the monocrystalline silicon substrate 208. Therefore, in the step of forming the contact hole 13 passing through the first interlayer insulator 206b to the light-shielding layer 11a by wet etching, the bonding boundary 221 does not need to be penetrated. Therefore, when forming the contact hole 13 by wet etching, the disadvantage that etching liquid infiltrates the bonding boundary 221 cannot be produced. Accordingly, a highly reliable liquid crystal apparatus capable of being manufactured with high yield can be obtained.

In the manufacturing method of the liquid crystal apparatus according to the embodiment, since the surface of the upper bonding film 12 is flattened by the CMP, the surface of the upper bonding film 12 can be easily and accurately flattened, so that the adhesion between the supposing substrate 10A and the monocrystalline silicon substrate 208 can be increased, and the bonding can be readily and accurately performed.

In the liquid crystal apparatus according to the embodiment, the light-shielding layer 11a is located higher than the bonding boundary 221 between the supporting substrate 10A and the monocrystalline silicon substrate 208, so that the bonding boundary 221 does not exist between the light-shielding layer 11a and the semiconductor layer 1a located higher than the light-shielding layer 11a, and the distance between the semiconductor layer 1a and the light-shielding layer 11a does not include the distance equivalent to the thickness necessary to bond the monocrystalline silicon substrate 208 to the supporting substrate 10A.

Therefore, the distance between the semiconductor layer 1a and the light-shielding layer 11a, i.e., the thickness of the first interlayer insulator 206b, can be reduced within the range capable of insulating the semiconductor layer 1a from the light-shielding layer 11a. The distance between the semiconductor layer 1a and the light-shielding layer 11a can be thereby reduced, enabling the light-shielding layer 11a to be actively used as backgating.

In the liquid crystal apparatus according to the embodiment, since the thickness of the fist interlayer insulator 206b is in a range of 30 mm to 200 nm, the semiconductor layer 1a can be securely insulated from the light-shielding layer 11a while by controlling the potential of the light-shielding layer 11a, the off-leak current can be reduced or the on-state current can be increased, so that a more excellent liquid crystal apparatus can be obtained.

In addition, according to the present invention, in order to increase the adhesion between the supporting substrate 10A and the monocrystalline silicon substrate 208, on the surface of the supporting substrate 10A on which the monocrystalline silicon substrate 208 is bonded, the lower bonding film 10B made of the same material as that of the upper bonding film 12 may be preferably formed, as is exemplified in this embodiment. However, the lower bonding film 10B is not necessarily formed Also, according to the embodiment, the selective oxidation mask-pattern 209a is made of silicon nitride. Alternatively, it may be made of other inorganic films or an organic film such as a photoresist.

Figure 14:
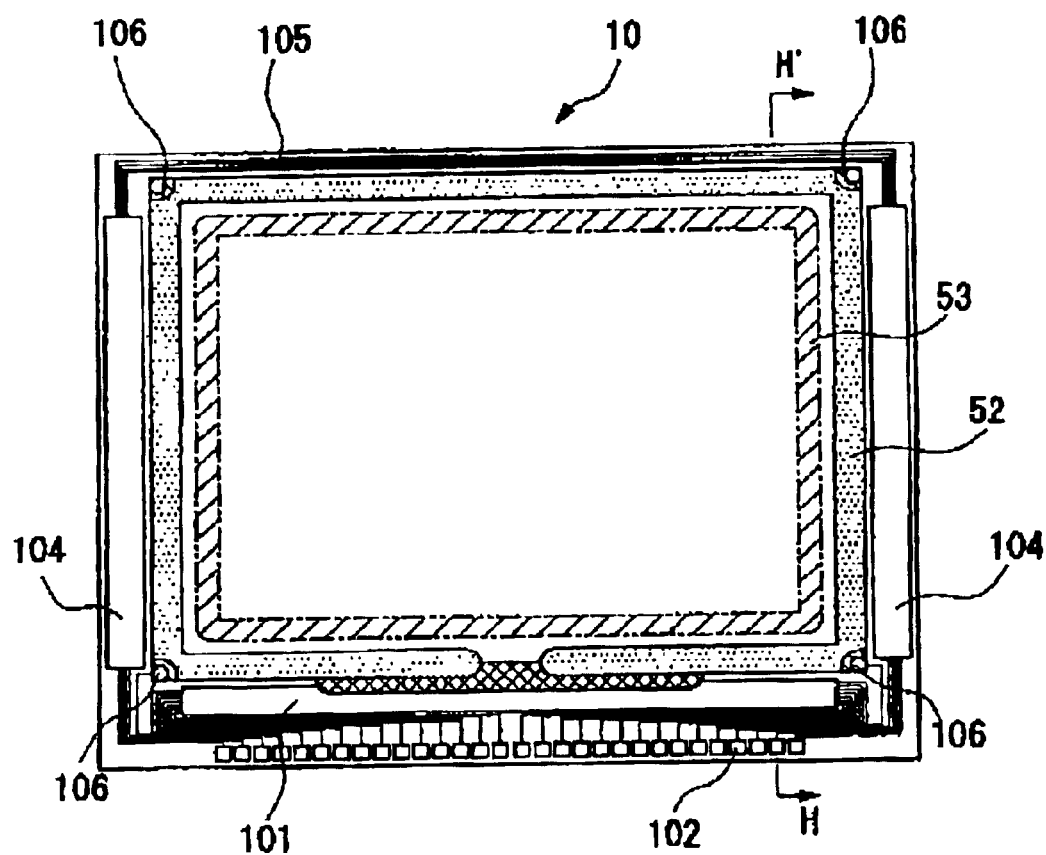
FIG. 14 is a plan view of a TFT array substrate according to a first embodiment together with various components formed thereon viewed from a counter substrate.
Figure 15:
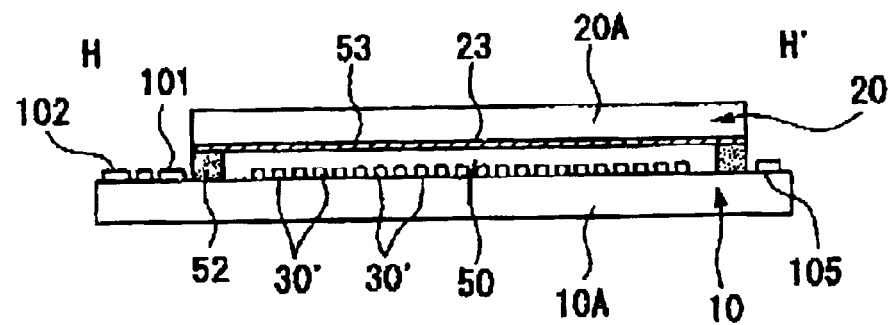
FIG. 15 is a sectional view taken along plane H—H' of FIG. 14.

The overall structure of the liquid crystal apparatus according to the embodiment and configured as described above will be described below with reference to FIGS. 14 and 15. FIG. 14 is a plan view of the TFT array substrate 10 viewed from the counter substrate 20; FIG. 15 is a sectional view taken along plane H–H' of FIG. 13 including the counter substrate 20.

Referring to FIG. 14, on the surface of the TFT array substrate 10, a scaling material 52 is arranged along the periphery thereof, and as shown in FIG. 15, the counter substrate 20 having substantially the same outline as that of the sealing material 52 shown in FIG. 14 is bonded to the TFT array substrate 10 with the scaling material 52.

On the surface of the counter substrate 20, as shown in FIG. 15, a counter-substrate light-shielding layer 53, which is made of a material equal to or different from that of the counter-substrate light-shielding layer 23, is formed in parallel with the inside of the sealing material 52 as a peripheral break line.

In the region outside the sealing material 52 on the TFT array substrate 10, a data-line driving circuit 101 and a mounting terminal 102 are arranged along one side of the TFT array substrate 10, while scanning-line driving circuits 104 are arranged along the two sides neighboring the one side. When the delay of a scanning signal supplied to the scanning line 3a is not a problem, it is of course that the scanning-line driving circuit 104 may be arranged on only one side.

The data-line driving circuits 101 maybe arranged on both sides of the display region (pixel part) along the side thereof. For example, to the data lines 6a in the odd number sequence, an image signal may be supplied from the data-line driving circuit arranged along one side of the display region while to the data lines 6a in the even number sequence, an image signal may be supplied from the data-line driving circuit arranged along the other side of the display region. When driving the data lines 6a in such au interdigital manner, an occupied area of the data-line driving circuits 101 can be expanded, enabling a complicated circuit to be configured.

Furthermore, on the one residual side of the TFT array substrate 10, plural wirings 105 are arranged to connect between the scanning-line driving circuits 104 arranged on both sides of the display region. Moreover, as a peripheral break line, a pre-charge circuit may be arranged as concealed under the counter-substrate light-shielding layer 53. Also, at least at one position in a corner part between the TFT array substrate 10 and the counter substrate 20, a conductive material 106 is arranged to electrically connect between the TFT array substrate 10 and the counter substrate 20.

On the surface of the TFT array substrate 10, an inspection circuit may also be further formed to inspect the quality and defects of the electric optical apparatus produced during the manufacturing and shipping. Instead of arranging the data-line driving circuit 101 and the scanning-line driving circuit 104 on the surface of the TFT array substrate 10, they may be electrically and mechanically connected to a driving LSI mounted on a TAB (tape-automated bonding substrate) via an anisotropic conductive film arranged in the peripheral region of the TFT array substrate 10, for example.

On each of the light-incident side of the counter substrate 20 and the light-emitting side of the TFT array substrate 10, a polarization film, a phase-difference film, and a polarizing device are arranged in predetermined directions corresponding to an operational mode, such as TN (twisted nematic) mode, STN (super twisted nematic) mode, and D-STN (dual-scan super twisted nematic) mode, or by mode of normally white/normally black.

When the liquid crystal apparatus according to the embodiment is incorporated in a color liquid-crystal projector (projection display), three electric optimal apparatuses are used as light valves for R, G, and B, and each color light separated through respective dichroic mirrors for R, G, and B enters each panel as a projection light ray. Therefore, the counter substrate 20 is not provided with a color filter unlike in the embodiment.

However, on the surface of the counter substrate 20 in the side of the liquid crystal layer 50 in the substrate body 20A, color filters for R, G, and B may be provided together with a protection film in a predetermined region not having the counter-substrate light-shielding layer 23 formed therein and opposing the pixel electrode 9a. By such a structure, the electric optical apparatus according to the embodiment can be incorporated in a color electric optical apparatus, such as a straight- or reflection-type color liquid-crystal television other than the liquid crystal projector.

Moreover, on the surface of the counter substrate 20, micro lenses may be formed so that one lens corresponds to one pixel. In such a structure, a bright electric optical apparatus is achieved by enhancing the beam-condensing efficiency of incident light. Furthermore, by depositing several layered interference layers, each being different in the refractive index, on the surface of the counter substrate 20, a dichroic filter for producing RGB colors using light interference may be provided. The counter substrate with the dichroic filter can achieve a more bright color electric optical apparatus.

In the liquid crystal apparatus according to the embodiment, the incident light enters from the counter substrate 20 identically as before. Since the TFT array substrate 10 is provided with the light-shielding layer 11a, alternatively, the incident light may enter from the TFT array substrate 10 so as to emit from the counter substrate 20. That is, even when such a liquid crystal apparatus is attached to the liquid crystal projector, incident light can be prevented from entering the channel region 1a' and LDD regions 1b and 1c of the semiconductor layer 1a, enabling high-quality images to be displayed.

In order to prevent the reflection on the back surface of the TFT array substrate 10, in the related art it has been required to additionally arrange an AR (anti-reflection)-coated polarizing device to prevent reflection or to bond an AR film. According to the embodiment, however, since the light-shielding layers 11a are formed on the surface of the TFT array substrate 10 and at least between the channel region 1a' and LDD regions 1b and 1c of the semiconductor layer 1a, it is not necessary to use the AR-coated polarizing device, an AR film, or a TFT array substrate 10 with the AR-treated substrate itself Therefore, according to the embodiment, there are advantages that material cost can be reduced and the yield during bonding the polarizing device cannot be reduced by dust or defects. By virtue of the excellent light-resistance, even when using a bright light-source or enhancing efficiency for light utilization by polarization converting due to a polarization beam splitter, deterioration in image quality, such as a cross talk due to light, cannot be produced.

A projection display will be described below as an example of an electronic instrument using the liquid crystal apparatus according to the embodiment.

Figure 16:
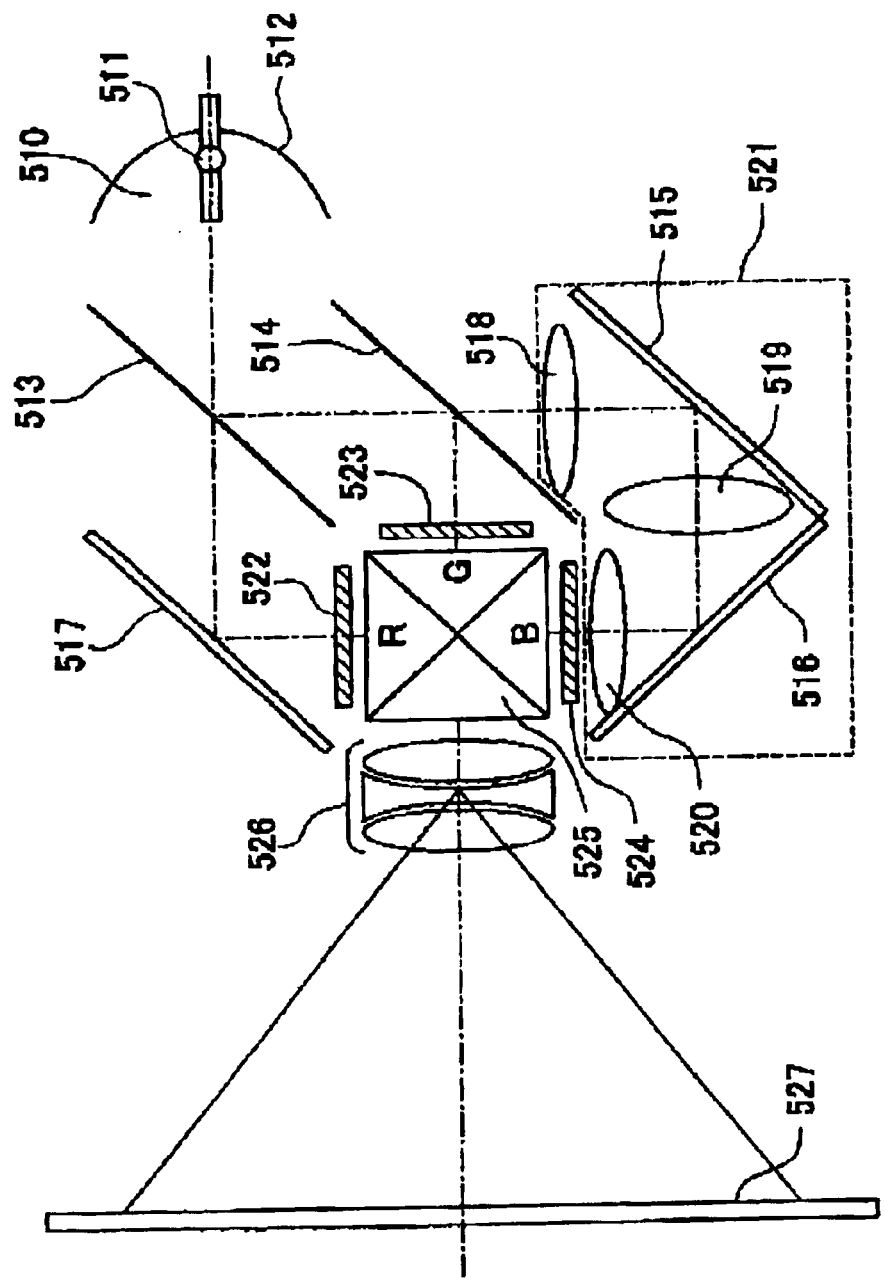
FIG. 16 is a schematic of a projection display that is an example of an electronic instrument using the liquid crystal apparatus.

FIG. 16 is a schematic of a projection display having the liquid crystal apparatus according to the first embodiment. This projection display is a so-called three-plate type projection display using three liquid crystal panels, where the liquid crystal apparatus according to the embodiment is used as a liquid crystal panel constituting a liquid crystal light valve.

Referring to FIG. 16, numeral 510 denotes a light source; numerals 513 and 514 denote dichroic mirrors; numerals 515, 516, and 517 denote reflection mirrors; numerals 518, 519, and 520 denote relay lenses; numerals 522, 523, and 524 denote liquid crystal light valves; numeral 525 denotes a cross-dichroic prism; and numeral 526 denotes a projection lens.

The light source 510 includes a lamp 511 such as an ultra-high-pressure mercury lamp and a reflector 512 to reflect the light from the lamp 511. The dichroic mirror 513 to reflect blue light and green light allows red light in the white light from the light source 510 to be transmitted therethrough while reflecting blue light and green light. The transmitted red light is reflected by the reflection mirror 517 so as to enter the liquid crystal light valve 522 for red light.

On the other hand, the green light in the color light reflected by the dichroic mirror 513 is reflected by the dichroic mirror 514 to reflect green light so as to enter the liquid crystal light valve 523 for green light. Whereas, the blue light also transmits the second dichroic mirror 514. In order to compensate that the blue light is different in the light-path length from the green light and red light, a light-guiding device 521 is provided that includes a relay-lens system including the incident lens 518, the relay lens 519, and the emitting lens 520, and the blue light enters the liquid crystal light valve 524 for blue light via the light-guiding device 521.

The three color light-rays modulated by the respective light valves enter the cross-dichroic prism 525. The prism is formed of four rectangular prisms bonded to each other having a dielectric multi-layered film for reflecting red light and a dielectric multi-layered film to reflect blue light crisscross formed on the internal surface. By these dielectric multi-layered films, three color light-rays are combined so as to form the light displaying color images. The combined light is projected on a screen 527 by a projection lens system 526 that is a projection optical system so as to display magnified images.

Such a projection display is a highly reliable and excellent projection display because it has the liquid crystal apparatus described above.

Another example of the electronic instrument using the liquid crystal apparatus according to the first embodiment will be described below.

Figure 17:
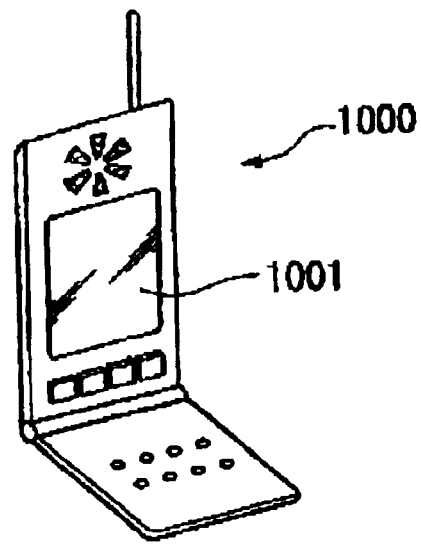
FIG. 17 is a perspective view illustrating another example of the electronic instrument using the liquid crystal apparatus according to the first embodiment.

FIG. 17 is a perspective view of a portable telephone. Referring to FIG. 17, numeral 1000 denotes a portable telephone body and numeral 1001 denotes a liquid crystal display using the liquid crystal apparatus described above.

Figure 18:
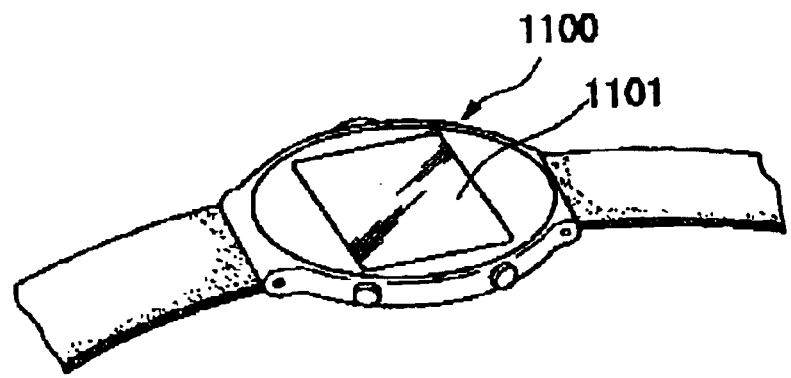
FIG. 18 is a perspective view illustrating another example of the electronic instrument using the liquid crystal apparatus according to the first embodiment.

FIG. 18 is a perspective view of a watch-type electronic instrument. Referring to FIG. 18, numeral 1100 denotes a watch body and numeral 1101 denotes a liquid crystal display using the liquid crystal apparatus described above.

Figure 19:
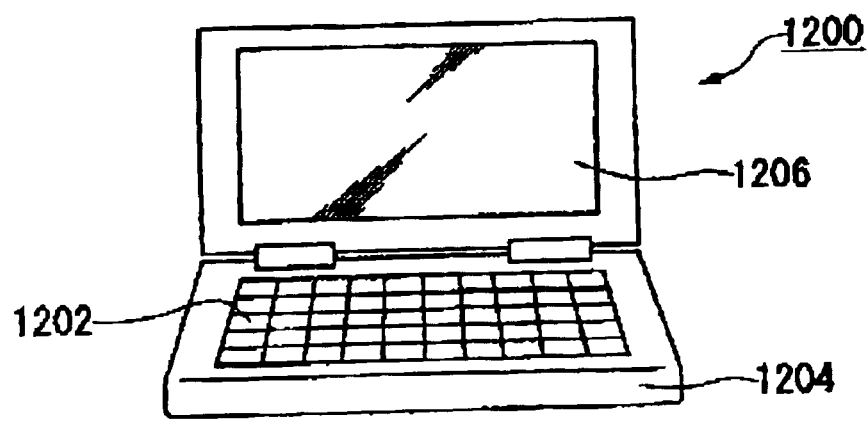
FIG. 19 is a perspective view illustrating another example of the electronic instrument using the liquid crystal apparatus according to the first embodiment.

FIG. 19 is a perspective view of a portable information processor such as a word processor and personal computer. Referring to FIG. 19, numeral 1200 denotes an information processor, numeral 1202 denotes an input part such as a keyboard; numeral 1204 denotes an information-processor body; and numeral 1206 denotes a liquid crystal display using the liquid crystal apparatus described above.

Since the electronic instruments shown in FIGS. 17 to 19 have the liquid crystal apparatuses according to the first embodiment described above, an electronic instrument with highly reliable and excellent display can be obtained.

In addition, the present invention is not limited to the embodiments described above. Various modifications can be made within the spirit and scope of the present invention. For example, the specific structure of the liquid crystal apparatus described with reference to FIGS. 1 to 15 is only one example, so that liquid crystal apparatuses of other various structures may be incorporated into the present invention. Also, it is needless to say that the present invention is applicable to an electric optical apparatus using various electric optical elements using an EL (electroluminescence), DMD (digital micro-mirror device), plasma emission, or fluorescence due to electron emission, and an electronic instrument having such an electric optical apparatus.

As described above, in the electric optical apparatus and the manufacturing method thereof according to the present invention, since the light-shielding layer is located on the side upper than the bonding boundary between the supporting substrate and the semiconductor substrate, when having the contact hole passing through a member which is located on the side upper than the light-shielding layer toward the light-shielding layer, the contact hole does not pass through the bonding boundary between the semiconductor substrate and the supporting substrate. Therefore, when forming the contact hole by using wet etching, there is no disadvantage that etching liquid infiltrates the bonding boundary between the supporting substrate and the semiconductor substrate, as in a related art electric optical apparatus.

Since the light-shielding layer is located on the side upper than the bonding boundary between the supporting substrate and the semiconductor substrate, the bonding boundary does not exist between the semiconductor layer and the light-shielding layer so that the distance between the semiconductor layer and the light-shielding layer can be reduced within the range capable of insulating the semiconductor layer from the light-shielding layer.

Therefore, the semiconductor layer can approach the light-shielding layer, enabling the light-shielding layer to be actively used for backgating, so that an off-leak current can be reduced or an on-state current can be increased by controlling the potential of the light-shielding layer.

Furthermore, by setting the thickness of the first insulator layer in a range of 30 nm to 200 nm, the semiconductor layer can be securely insulated from the light-shielding layer, while by controlling the potential of the light-shielding layer, the off-leak current can be reduced or the on-state current can be increased, so that a more excellent electric optical apparatus can be obtained.

What is claimed is:

1. An electric optical apparatus using a composite substrate formed by bonding a semiconductor substrate that includes a semiconductor layer on a supporting substrate, the electric optical apparatus comprising:

a first insulator layer formed on an underside of the semiconductor layer;

a second insulator layer formed below the first insulator layer;

a light-shielding layer formed between the first insulator layer and the second insulator layer, the light-shielding layer being located above a bonding boundary between the supporting substrate and the semiconductor substrate; and a contact hole extending through at least the first insulator layer to the light-shielding layer.

2. The apparatus according to claim 1, the thickness of the first insulator layer being in a range of 30 nm to 200 nm.

3. The apparatus according to claim 2, the thickness of the first insulator layer being in a range of 50 nm to 100 nm.

4. A projection display, comprising:

a light source;

the electric optical apparatus according to claim 2, the electric optical apparatus modulating emitted light from the light source; and a magnifying projection optical system to magnify and project the light modulated by the electric optical apparatus on a projection surface.

5. An electronic instrument, comprising:

the electric optical apparatus according to claim 2.

6. The apparatus according to claim 1, the thickness of the first insulator layer being in a range of 50 nm to 100 nm.

7. A projection display, comprising:

a light source;

the electric optical apparatus according to claim 6, the electric optical apparatus modulating emitted light from the light source; and a magnifying projection optical system to magnify and project the light modulated by the electric optical apparatus on a projection surface.

8. An electronic instrument, comprising:

the electric optical apparatus according to claim 6.

9. A projection display, comprising:

a light source;

the electric optical apparatus according to claim 1, the electric optical apparatus modulating emitted light from the light source; and a magnifying projection optical system to magnify and project the light modulated by the electric optical apparatus on a projection surface.

10. An electronic instrument, comprising:

the electric optical apparatus according to claim 9.

11. An electronic instrument, comprising:

the electric optical apparatus according to claim 1.

12. A manufacturing method of an electric optical apparatus using a composite substrate formed by bonding a semiconductor substrate that includes a semiconductor layer on a supporting substrate, the method comprising:

sequentially forming a first insulator layer, a light-shielding layer, and a second insulator layer in that order on a surface of the semiconductor substrate, on which the supporting substrate is bonded;

bonding the semiconductor substrate on the supporting substrate to form the composite substrate;

patterning the semiconductor layer; and forming a contact hole that extends through the first insulator layer to the light-shielding layer by wet etching.

13. The method according to claim 12, forming the first insulator layer includes forming the first insulator layer to have a thickness between 30 nm and 200 nm.

14. The method according to claim 13, the step of bonding the semiconductor substrate on the supporting substrate being performed after the surface of the second insulator layer is flattened by a chemical and mechanical polishing method.

15. The method according to claim 12, the step of bonding the semiconductor substrate on the supporting substrate being performed after the surface of the second insulator layer is flattened by a chemical and mechanical polishing method.

* * * * *